United States Patent
Doermann et al.

(10) Patent No.: US 10,686,840 B1
(45) Date of Patent: *Jun. 16, 2020

(54) SYSTEM AND ARCHITECTURE FOR ELECTRONIC PERMISSIONS AND SECURITY POLICIES FOR RESOURCES IN A DATA SYSTEM

(71) Applicant: Addepar, Inc., Mountain View, CA (US)

(72) Inventors: Matthew Andreas Doermann, Palo Alto, CA (US); Alan Tracey Wootton, Saratoga, CA (US); Louise Elizabeth Briguglio, San Francisco, CA (US)

(73) Assignee: Addepar, Inc., Mountain View, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/900,059

(22) Filed: Feb. 20, 2018

Related U.S. Application Data

(63) Continuation of application No. 15/279,810, filed on Sep. 29, 2016, now Pat. No. 9,935,983, which is a
(Continued)

(51) Int. Cl.
*H04L 9/00* (2006.01)
*H04L 29/06* (2006.01)

(52) U.S. Cl.
CPC .............. *H04L 63/20* (2013.01); *H04L 63/10* (2013.01)

(58) Field of Classification Search
CPC ................................ H04L 63/10; H04L 63/20
See application file for complete search history.

(56) References Cited

U.S. PATENT DOCUMENTS

| 6,865,567 B1 | 3/2005 | Oommen et al. |
| 7,046,248 B1 | 5/2006 | Perttunen |

(Continued)

FOREIGN PATENT DOCUMENTS

| CA | 2817652 | 12/2013 |
| CA | 2817660 | 12/2013 |

(Continued)

OTHER PUBLICATIONS

Chakrabarti, D., & Faloustsos, C. (2006). Graph mining. ACM Computing Surveys, 38(1), 2. doi:http://doi.acm.org.10.1145/1132952.1132954 retrieved on Feb. 6, 2015.

(Continued)

*Primary Examiner* — Beemnet W Dada
(74) *Attorney, Agent, or Firm* — Knobbe Martens Olson & Bear LLP

(57) ABSTRACT

An electronic permissions and security system are disclosed which may be used to determine permissions and policies for resources in a complex multi-dimensional data system. Analysis of resource data hierarchies and/or accessor data hierarchies using the permissions computing systems and methods discussed herein may provide efficient and flexible permissions analysis, determination, and management. The electronic permissions system may include for example, a permissions analysis module or component configured to access, traverse and/or analyze a resource hierarchy and/or an accessor hierarchy to determine permissions with respect to a resource. Permissions may be defined according to various policies which may include specific actions allowed or disallowed for the policy. Specific actions within a policy may also be organized hierarchically such that one particular grant of one permission may imply granting of another permission.

17 Claims, 15 Drawing Sheets

Related U.S. Application Data continuation of application No. 14/944,009, filed on Nov. 17, 2015, now Pat. No. 9,485,259, which is a continuation of application No. 14/644,118, filed on Mar. 10, 2015, now Pat. No. 9,218,502.

(60) Provisional application No. 62/065,486, filed on Oct. 17, 2014.

(56) References Cited

U.S. PATENT DOCUMENTS

| | | | |
|---|---|---|---|
| 7,395,270 | B2 | 7/2008 | Lim et al. |
| 7,533,057 | B2 | 5/2009 | Whipple et al. |
| 7,644,088 | B2 | 1/2010 | Fawcett et al. |
| 7,769,682 | B2 | 8/2010 | Mougdal |
| 7,827,082 | B1 | 11/2010 | Shanmugan |
| 7,836,394 | B2 | 11/2010 | Linder |
| 7,873,557 | B2 | 1/2011 | Guidotti et al. |
| 7,949,937 | B2 | 5/2011 | Wu |
| 7,966,234 | B1 | 6/2011 | Merves et al. |
| 7,996,290 | B2 | 8/2011 | Dweck et al. |
| 8,117,187 | B2 | 2/2012 | Mostl |
| 8,249,962 | B1 | 8/2012 | Stephens et al. |
| 8,306,891 | B1 | 11/2012 | Findlay, III et al. |
| 8,458,764 | B2 | 6/2013 | Karjoth et al. |
| 8,819,763 | B1 | 8/2014 | Cheung et al. |
| 9,015,073 | B2 | 4/2015 | Mirra et al. |
| 9,087,361 | B2 | 7/2015 | Mirra et al. |
| 9,105,062 | B2 | 8/2015 | Posch et al. |
| 9,105,064 | B2 | 8/2015 | Posch et al. |
| 9,218,502 | B1 | 12/2015 | Doermann et al. |
| 9,244,899 | B1 | 1/2016 | Greenbaum |
| 9,325,739 | B1 | 4/2016 | Roth et al. |
| 9,424,333 | B1 | 8/2016 | Bisignani et al. |
| 9,485,259 | B1 | 11/2016 | Doermann et al. |
| 9,760,544 | B2 | 9/2017 | Mirra et al. |
| 9,916,297 | B1 | 3/2018 | Greenbaum |
| 9,935,983 | B1 | 4/2018 | Doermann et al. |
| 10,013,717 | B2 | 7/2018 | Posch et al. |
| 10,331,778 | B1 | 6/2019 | Greenbaum |
| 10,372,807 | B1 | 8/2019 | Greenbaum et al. |
| 10,430,498 | B2 | 10/2019 | Mirra et al. |
| 2002/0042764 | A1 | 4/2002 | Gardner et al. |
| 2003/0174165 | A1 | 9/2003 | Barney |
| 2004/0236655 | A1 | 11/2004 | Scumniotales et al. |
| 2005/0187852 | A1 | 8/2005 | Hwang |
| 2005/0222929 | A1 | 10/2005 | Steier et al. |
| 2005/0262047 | A1 | 11/2005 | Wu |
| 2006/0146719 | A1 | 7/2006 | Sobek et al. |
| 2007/0011071 | A1 | 1/2007 | Cuscovitch et al. |
| 2008/0139191 | A1 | 6/2008 | Melnyk et al. |
| 2008/0270316 | A1 | 10/2008 | Guidotti et al. |
| 2009/0164387 | A1 | 6/2009 | Armstrong et al. |
| 2009/0249359 | A1 | 10/2009 | Caunter et al. |
| 2009/0327293 | A1* | 12/2009 | Takashima .............. G06F 16/13 |
| 2010/0100802 | A1 | 4/2010 | Delaporte |
| 2011/0283242 | A1 | 11/2011 | Chew |
| 2011/0302221 | A1 | 12/2011 | Tobin et al. |
| 2012/0089432 | A1 | 4/2012 | Podgurny |
| 2012/0136804 | A1 | 5/2012 | Lucia et al. |
| 2012/0182882 | A1 | 7/2012 | Chrapko et al. |
| 2013/0212505 | A1 | 8/2013 | Herold |
| 2014/0250375 | A1 | 9/2014 | Malik |
| 2016/0035035 | A1 | 2/2016 | Posch et al. |
| 2018/0276758 | A1 | 9/2018 | Posch et al. |

FOREIGN PATENT DOCUMENTS

| | | |
|---|---|---|
| CA | 2834265 | 6/2014 |
| EP | 1862955 | 5/2007 |
| EP | 2439691 | 4/2012 |
| EP | 2672446 | 12/2013 |
| EP | 2672447 | 12/2013 |
| EP | 2743881 | 6/2014 |
| HK | 1193898 | 10/2014 |
| JP | 2002197277 A | 7/2002 |
| SG | 195517 | 12/2013 |
| SG | 195518 | 4/2015 |
| WO | WO 2005/036364 A2 | 4/2005 |

OTHER PUBLICATIONS

Wagner et al.,: Assessing the Vulnerability of Supply Chain Using Graph Theory, 2010, International Journal of Production Economics 126, pp. 121-129.

Yang et al.,: Incremental Mining of Across-Stream Sequential Patterns in Multiple Data Streams, Mar. 2011, Journal of Computers, vol. 6, No. 3, pp. 449-457.

European Patent Office, "Extended Search Report" in application No. 13170954.5, dated Jan. 21, 2014, 6 pages.

European Patent Office, "Search Report" in application No. 13170952.9, dated Jan. 21, 2014, 6 pages.

European Patent Office, "Search Report" in application No. 13197286.1, dated Mar. 14, 2014, 5 pages.

Singapore, "Search and Examination Report" in application No. 201304378-1, dated Jul. 3, 2014.

Singapore, "Search and Examination Report" in application No. 201304379-9, dated Jan. 23, 2014.

* cited by examiner

Sample Resource Traversal Path 2

Sample Resource Traversal Path 1

Scenario: Does Accessor 3 have permission P2 on RN8?
Option 1:
Resource Traversal Path
Option 2:
Accessor Traversal Path
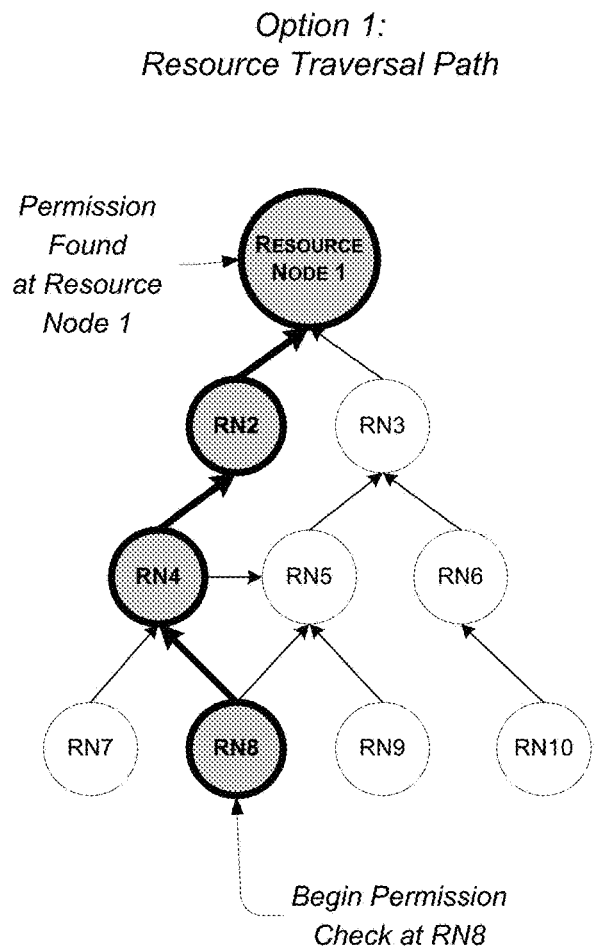
Permission Found at Resource Node 1
Begin Permission Check at RN8
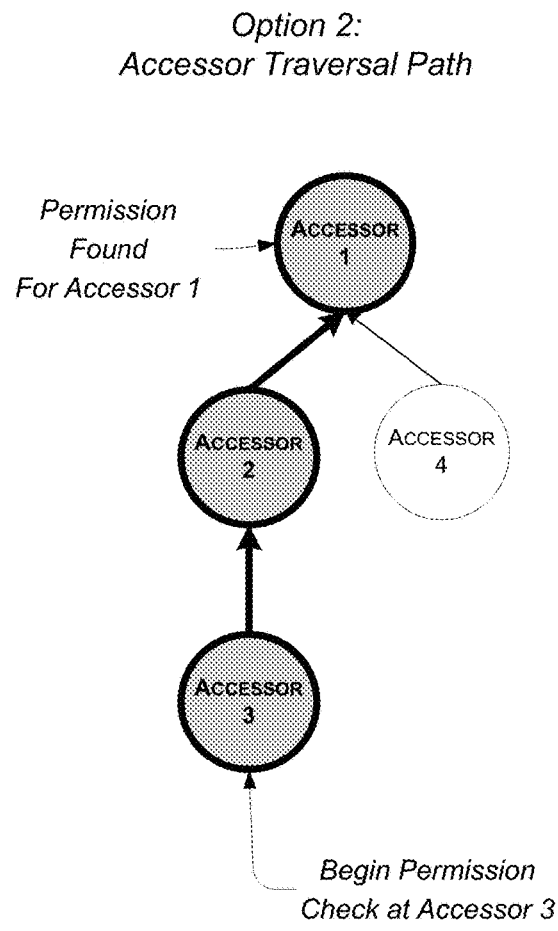
Permission Found For Accessor 1
Begin Permission Check at Accessor 3
FIG. 4

| | Resource Node 1 | RN2 | RN3 | RN4 | RN5 | RN6 | RN7 | RN8 | RN9 | RN10 |
|---|---|---|---|---|---|---|---|---|---|---|
| Accessor1 | P1, P2 | P1 | - | - | - | - | - | - | - | - |
| Accessor2 | - | - | - | - | - | - | - | - | - | - |
| Accessor3 | P2 | - | P1 | - | P2, P3 | P3 | P3 | P2 | - | - |
| Accessor4 | P3 | - | P1, P2 | - | - | - | - | P1 | - | - |
| ... | ... | ... | ... | ... | ... | ... | ... | ... | ... | ... |
| AccessorN | P1...PN | - | P1 | P2 | P3 | - | - | - | - | PN |

Conceptual Matrix of Permission Policies for Accessors With Respect to Resources — 500

FIG. 5

*Database Table of Permission Policies for Accessors With Respect to Resources*

600

| | Accessor | | Resource | | Permission Policy | |
|---|---|---|---|---|---|---|
| ID | Accessor ID | Accessor Type | Resource ID | Resource Type | Policy ID | Policy Type |
| | Accessor1 | Client | RN1 | System Data | P1 | View |
| | Accessor1 | Client | RN1 | System Data | P2 | Edit |
| | Accessor1 | Client | RN2 | Firm Data | P1 | View |
| | Accessor3 | User | RN1 | System Data | P2 | Edit |
| | Accessor3 | User | RN3 | Client Data | P1 | View |
| | Accessor3 | User | RN5 | Account Data | P2 | Edit |
| | Accessor3 | User | RN5 | Account Data | P3 | Delete |
| | Accessor3 | User | RN6 | Account Data | P3 | Delete |
| | Accessor3 | User | RN7 | Document | P3 | Delete |
| | Accessor4 | Group | RN1 | System Data | P3 | Delete |
| | Accessor4 | Group | RN3 | Client Data | P1 | View |
| | Accessor4 | Group | RN3 | Client Data | P2 | Edit |
| | Accessor4 | Group | RN8 | Transaction | P1 | View |
| | AccessorN | [Accessor] | RN1 | System Data | P1 | View |
| | AccessorN | [Accessor] | RN3 | Client Data | P1 | View |
| | AccessorN | [Accessor] | RN4 | Account Data | P2 | Edit |
| | AccessorN | [Accessor] | RN5 | Account Data | P3 | Delete |
| | AccessorN | [Accessor] | RN10 | Document | PN | [Policy] |
| ... | | | | | | |

FIG. 6

SYSTEM AND ARCHITECTURE FOR ELECTRONIC PERMISSIONS AND SECURITY POLICIES FOR RESOURCES IN A DATA SYSTEM

CROSS-REFERENCE TO RELATED APPLICATIONS

This application is a continuation of U.S. patent application Ser. No. 15/279,810, titled "SYSTEM AND ARCHITECTURE FOR ELECTRONIC PERMISSIONS AND SECURITY POLICIES FOR RESOURCES IN A DATA SYSTEM," and filed Sep. 29, 2016, which application is a continuation of U.S. patent application Ser. No. 14/944,009, titled "SYSTEM AND ARCHITECTURE FOR ELECTRONIC PERMISSIONS AND SECURITY POLICIES FOR RESOURCES IN A DATA SYSTEM," and filed Nov. 17, 2015, which application is a continuation of U.S. patent application Ser. No. 14/644,118, titled "SYSTEM AND ARCHITECTURE FOR ELECTRONIC PERMISSIONS AND SECURITY POLICIES FOR RESOURCES IN A DATA SYSTEM," and filed Mar. 10, 2015, which claims the benefit of U.S. Provisional Application No. 62/065,486, titled "SYSTEM AND ARCHITECTURE FOR ELECTRONIC PERMISSIONS AND SECURITY POLICIES FOR RESOURCES IN A DATA SYSTEM," and filed Oct. 17, 2014. The entire disclosures of all of the above items are hereby incorporated by reference herein for all purposes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Management of permissions and security access policies in computing and data environments is an ongoing concern for system administrators, managers, corporate entities, and executives. Some data and resources include highly sensitive information to which access or particular actions should be restricted or limited. As computing systems have grown in size and complexity from single computers, to multiple computers on a local network, to many more multiple computers across multiple networks, the number of resources and users alike have multiplied.

SUMMARY

The systems, methods, and devices described herein each have several aspects, no single one of which is solely responsible for its desirable attributes. Without limiting the scope of this disclosure, several non-limiting features will now be discussed briefly.

As the number of resources and users associated with computing and data systems have multiplied, management of permissions and security access for those resources and users has become a highly complex and non-trivial problem. Embodiments of an electronic permissions and security system are disclosed which may be used to determine permissions and policies for resources in a complex data system. Analysis of resource data hierarchies and/or accessor data hierarchies using the permissions computing systems and methods discussed herein may provide efficient and flexible permissions analysis, determination, and management. The electronic permissions system may include for example, a permissions analysis module or component configured to access, traverse and/or analyze complex data structures (including, for example, a mathematical graph having nodes and edges), calculate complex data based on the traversals, and/or display (and/or disable or enable) various user interfaces and/or UI elements to the user based on the calculated complex data.

Permissions may be defined according to various policies which may include specific actions allowed or disallowed for the policy. Thus, a policy may define or comprise a set of one or more permissions to perform specific actions. A policy associated with a resource and an accessor may then be understood to define or specify which specific actions the accessor is allowed or permitted to perform on or with respect to the resource. Specific actions within a policy may also be organized hierarchically such that a particular grant of one permission may imply or automatically grant another permission.

As used herein, an accessor may be a user, a group of users, a role (for example, a role which may be associated with a particular permission or permission policy), or any other logical indicator of an actor that performs actions (for example, read, write, create, view, and so on) within a data system. As used herein, a resource may be any item or group of items in a data system on which an accessor may perform an action.

Various embodiments of the present disclosure enable permissions determinations and creation of outputs (such as user interfaces, tables, and reports) while consuming less processing and/or memory resources than previous technology, permit users to have less knowledge of programming languages and/or software development techniques, and/or allow less technical users or developers to create outputs (such as user interfaces, tables, and/or reports). Thus, in some embodiments, the processes described herein are more efficient, and enable the permissions system to automatically access and analyze permissions with respect to complex data structures automatically. Further, various embodiments of the system further reduce memory requirements and/or processing needs via, for example, efficient traversal of complex resource and/or accessor data structures to determine permissions. Embodiments of the system further reduce memory requirements and/or processing needs via a complex graph data structure. For example, as described below, traversal paths may be logged and analyzed over time to identify preferred or more efficient paths to determine permissions, in order reduce memory requirements and/or processing requirements of the system. Faster and/or less memory intensive determination of permissions can further improve system response time, in particular to facilitate rapid generation and display of user interfaces which can include or involve a high number of resources with highly complex associated permissions.

BRIEF DESCRIPTION OF THE DRAWINGS

FIG. 4 illustrates sample resource and accessor hierarchy traversal paths demonstrating various ways in which a permission for a resource may be determined according to one embodiment of the permissions system of FIG. 14.

FIG. 5 illustrates a resource and accessor permissions matrix data structure as used in one embodiment of the permissions system of FIG. 14.

FIG. 6 illustrates another resource and accessor permissions data structure as used in one embodiment of the permissions system of FIG. 14.

DETAILED DESCRIPTION

Overview

Figure 1:
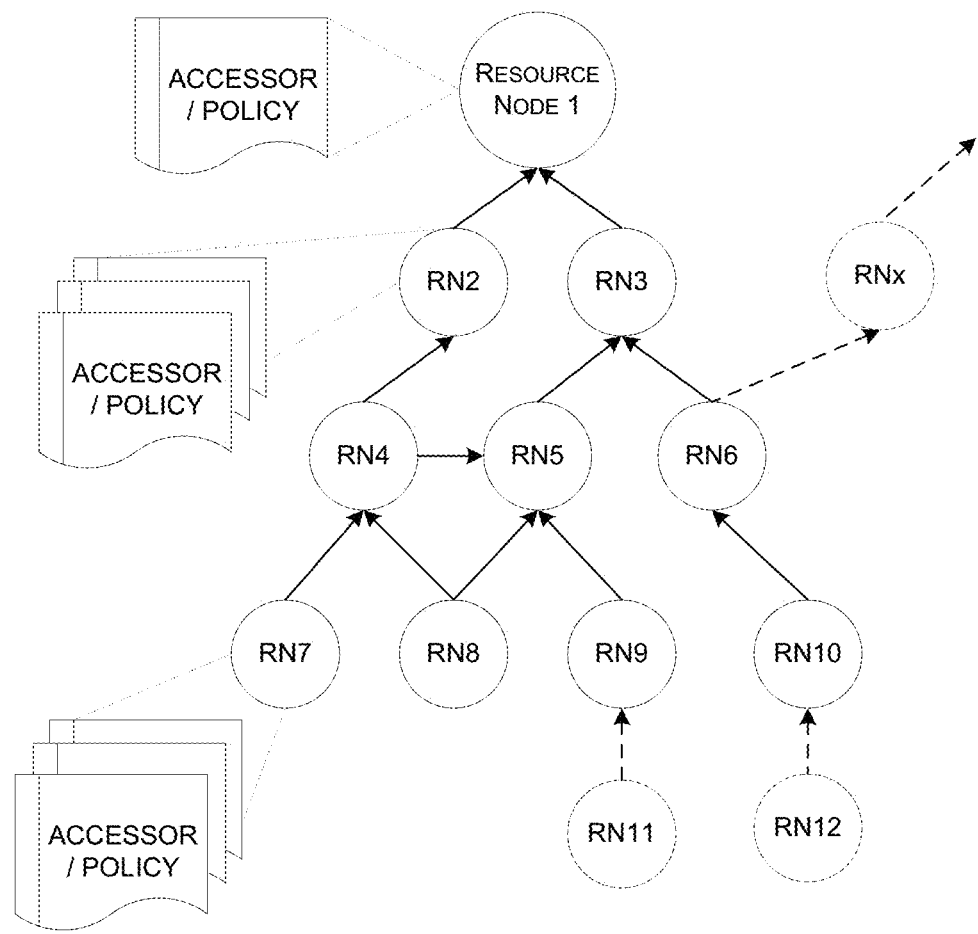
FIG. 1 is a diagram which illustrates an exemplary resource hierarchy as used in one embodiment of the permissions system of FIG. 14.

A permission may be defined as logical rule between two entities in a data system, such as between an accessor and a resource on which the accessors performs an action. The permissions system described herein may be configured to return a yes or no indicator for a proposed action between an accessor and a resource. The permissions system may not describe, or perform, the action but may be in communication with other systems or components of a data system which does perform the action and/or allows the accessor to perform the action. The permissions system may not list or enumerate all possible actions between accessors and resources, and may not enumerate all accessors or all resources. Instead this information may be accessed by the permissions system or provided to the permissions system by another system or component.

As an example, an accessor Alice may want to retrieve a document from a data repository. The permissions system may return a yes, or a no, about whether Alice can fetch the document, but may not fetch the document, enumerate all documents, or explicitly know anything about Alice or her documents. Thus, the permissions system may be provided as a standalone service (or module) that determines permissions for any set of accessors and resources. In one embodiment, the permissions system may filter a collection of resources against a proposed action and accessor. In this case only the resources that are allowed may be returned.

A policy may be defined as a collection of one or more actions. In some cases actions may be related, such as in a hierarchical fashion wherein permission to perform one action implies permission to perform a related action. For example, a document action may include (1) checking for existence of the document, (2) reading the document, and/or (3) modifying the document. In this case, permission to modify the document may imply permission to check for existence of the document and also permission to read the document. Policy actions can involve multiple levels and nuances. For example, in another scenario, a read permission might allow permission to read a document but may not include permission to access metadata associated with the document (creation date, author, etc.). One or more policies can be defined to be binary, (for example, yes/no permission for each action in the policy), cumulative (for example, write permission implies read permission), disjoint (for example, view permission may be permitted but not create permission), or any combination of the above (for example, cumulative and disjoint permissions may be defined for a policy).

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

For purposes of this disclosure, certain aspects, advantages, and novel features of various embodiments are described herein. It is to be understood that not necessarily all such advantages may be achieved in accordance with any particular embodiment of the invention. Thus, for example, those skilled in the art will recognize that one embodiment may be carried out in a manner that achieves one advantage or group of advantages as taught herein without necessarily achieving other advantages as may be taught or suggested herein.

Resource and Permissions Architecture

Figure 14:
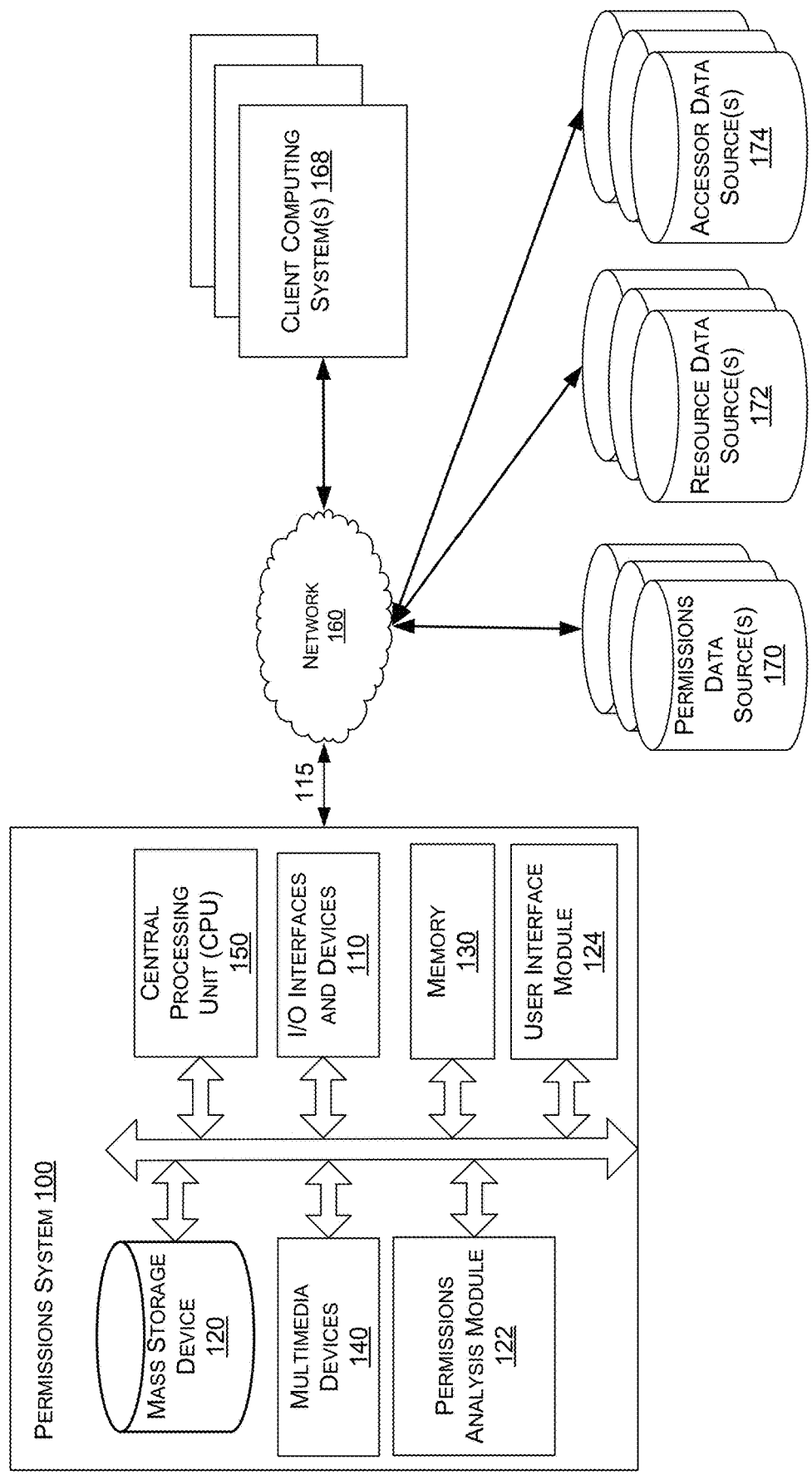
FIG. 14 is a block diagram of an implementation of an illustrative permissions system.

FIG. 1 is a diagram which illustrates an exemplary resource hierarchy as used in one embodiment of the permissions system 100 of FIG. 14. The exemplary resource hierarchy illustrates one approach to organizing multiple resources in a data system. Although the hierarchy is illustrated as a mathematical graph the hierarchy may be organized in different ways. For example, in another embodiment, the resource hierarchy may be a directed graph wherein an arrow connecting two nodes in the resource hierarchy may represent a parent-child relationship.

With reference to the mathematical graph illustrated in FIG. 1, resources in a data system may be logically connected to or associated with either other resources or resource groups in various parent-child relationships. A parent-child relationship may imply or convey a connection, such as an inheritance relationship, such that one or more attributes, including a permission policy, for a child resource may be determined from the parent resource or resource group. In the mathematical graph of FIG. 1, resources may be represented by one or more leaf nodes (e.g., RN7, RN8, RN11, and RN12), and resource groups may be represented by one or more parent or intermediary nodes (e.g., Resource Node 1, RN2, RN3, RN4, RN5, RN6, RN9, and RN 10) and/or root nodes (e.g., Resource Node 1, RNx). In some embodiments a resource group may also be a resource, and thus the parent, intermediary, and/or root nodes may also represent resources.

As the illustrated resource hierarchy of FIG. 1 demonstrates, a particular resource may be logically connected to or associated with multiple other resources or resource groups. For example, RN8 is associated with two parent nodes, RN4 and RN5. In another example, RN4 is associated with two child nodes, RN7 and RN8; a parent node, RN2; and another node, RN5, which may be considered to be another parent node to RN4, such that attributes associated with RN4 may be determined from either RN2 or RN5 in any combination. For example, as discussed in more detail throughout this disclosure, a permission policy for RN4 may be determined from either RN2, RN5, or both. One practical result of the resource hierarchy of FIG. 1 is that multiple permission "inheritance" paths from a leaf resource node (or other resource node) to a root node may exist, such as the sample resource traversal paths illustrated in FIGS. 3A and 3B. For example, RN8 may trace a traversal path to Resource Node 1 in three different ways: RN8→RN4→RN2→RN1; RN8→RN4→RN5->RN3→RN1; or RN8→RN5→RN3→RN1.

As further illustrated in FIG. 1, and as mentioned above, each resource node in the resource hierarchy may have one or more associated permission policies. Examples permission policies are discussed in more detail herein with respect to FIGS. 7A and 7B. A permission policy may specify for example one or more actions, permissions, and/or security rights, some of which may be hierarchical or cumulative. The permission policy may be associated with one or more accessors and/or the resource, as illustrated and described with respect to FIGS. 5 and 6. Any resource can have a virtually unlimited number of associated permission policies specifying a virtually unlimited number of actions that a virtually unlimited number of accessors are permitted to perform with respect to the resource. As will be explained in more detail, permission policies may also specify, define, or be organized in permission hierarchies. For example, a permission policy may specify that any user with a write permission on a resource may also have a read permission.

Figure 2:
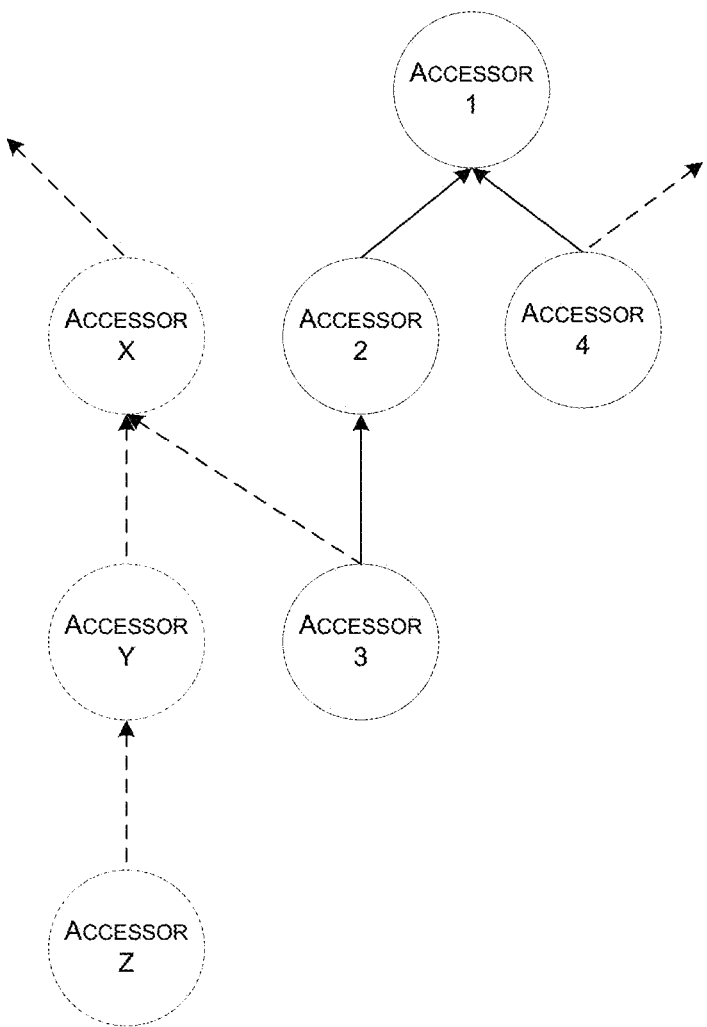
FIG. 2 is a diagram which illustrates an exemplary accessor hierarchy as used in one embodiment of the permissions system of FIG. 14.

FIG. 2 is a diagram which illustrates an exemplary accessor hierarchy as used in one embodiment of the permissions system 100 of FIG. 14. The exemplary accessor hierarchy illustrates one approach to organizing multiple accessors (for example, user groups, roles, and so forth) in a data system. Although the hierarchy is illustrated as a mathematical graph, the hierarchy may be organized in different ways. For example, in another embodiment, the accessor hierarchy may be a directed graph wherein an arrow connecting two nodes in the accessor hierarchy may represent a parent-child relationship.

With reference to the mathematical graph illustrated in FIG. 2, accessors in a data system may be logically connected to or associated with either other accessors or accessor groups in various parent-child relationships. A parent-child relationship may imply or convey a connection, such that one or more attributes, including a permission policy, associated with a child accessor may be determined from the parent accessor or accessor group. In the mathematical graph of FIG. 2, accessor may be represented by one or more leaf nodes (e.g., Accessor Z, Accessor 3, and Accessor 4), and accessor groups may be represented by one or more parent or intermediary nodes (e.g., Accessor Y, Accessor X, Accessor 2, and Accessor 1) and/or root nodes (e.g., Accessor 1, Accessor X). In some embodiments an accessor group may also be an accessor, and thus the parent, intermediary, and/or root nodes may also represent accessors.

As the illustrated accessor hierarchy of FIG. 2 demonstrates, a particular accessor may be logically connected to or associated with multiple other accessors or accessor groups. For example, Accessor 3 is associated with two parent nodes, Accessor 2 and Accessor X. In another example, Accessor 2 is associated with one child node, Accessor 4; and a parent node, Accessor 1. For example, as discussed in more detail throughout this disclosure, permissions for Accessor 3 may be determined from either Accessor X, Accessor 2, or both. For example, Accessor 3 may be an engineer; Accessor 2 may be a first, primary core engineering team or group to which the engineer belongs or is a member; Accessor X may be a cross-functional engineering team or group to which the engineer belongs or is a member. In this case, the core engineering team may have different permissions than the cross-functional engineering team (some permissions may also be in common or overlap). The engineer (Accessor 3) may then inherit both sets of permissions, that is, the permissions associated with the core engineering team (Accessor 2) and the cross-functional engineering team (Accessor X). One practical result of the accessor hierarchy of FIG. 2 is that, similar to the resource hierarchies described with reference to FIGS. 1, 3A, and 3B, multiple traversal paths from a leaf accessor node to a root node may exist. For example, Accessor 3 may trace a traversal path to Accessor X (Accessor 3→Accessor X), or to Accessor 1 (Accessor 3→Accessor 2→Accessor 1). As described in certain embodiments herein, the permissions system and approaches facilitate use of this and other example accessor hierarchies in such a way that the permissions system need not know whether a particular accessor has any child nodes, only whether the particular accessor has any parent nodes and/or how to access such information wherever it may be stored.

Figure 3B:
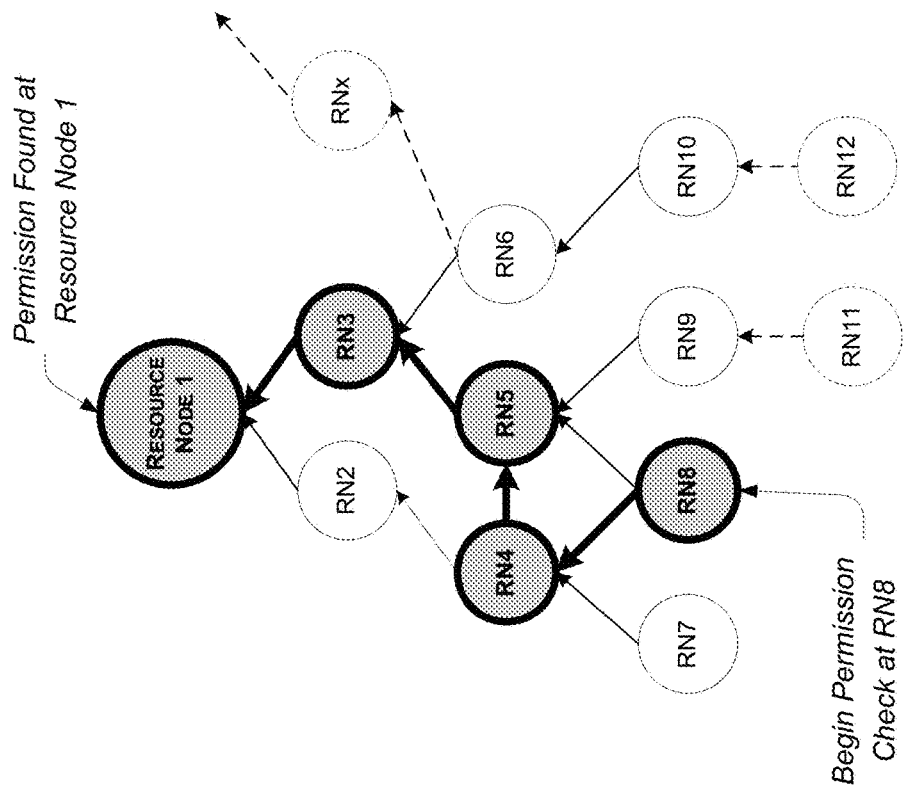
FIGS. 3A and 3B illustrate sample resource hierarchy traversal paths demonstrating various ways in which a permission for a resource may be determined according to one embodiment of the permissions system of FIG. 14.
Figure 3A:
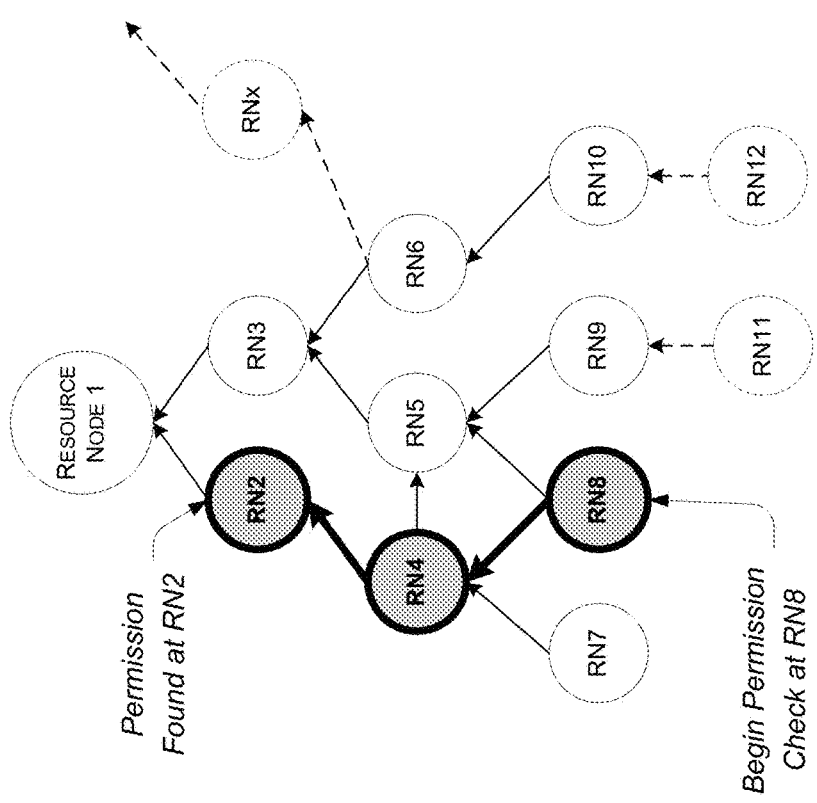

FIGS. 3A and 3B illustrate sample resource hierarchy traversal paths demonstrating various ways in which a permission for a resource may be determined according to one embodiment of the permissions system 100 of FIG. 14. Each resource hierarchy illustrates different traversal paths to determine whether a particular permission is granted with respect to a leaf resource node, RN8.

Efficient determination of whether a particular permission is granted with respect to a resource may be achieved by, for example, traversing the resource hierarchy only until a particular permission is found or not. Once a particular permission sought has been found, the traversal process may end, and thus traversal of an entire resource hierarchy may not be necessary. Further, as illustrated in FIGS. 3A and 3B, multiple traversal paths may be possible, some of which may be shorter and more efficient to traverse in order to find a particular permission. In some embodiments, the permissions system 100 may log or record traversal paths or patterns, traversal or processing times, and/or computer memory use associated with determining or finding a particular permission with respect to various resource hierarchies. The permissions system 100 may then analyze these traversal paths or patterns, traversal or processing times, and/or computer memory use to, for example, identify more efficient traversal paths or patterns and flag them for preferred use again in subsequent permissions determinations. Thus the permissions determination process may become faster and/or more efficient over time as the permissions system 100 learns which traversal paths or patterns use the least amount of computer memory, lead to the fastest processing time, or other metric which may indicate one traversal path or pattern is preferred or desirable. Such efficiency learning may be particularly beneficial in a data system wherein resource hierarchies do not change frequently and thus permissions determinations may be more consistent and predictable over time.

In FIG. 3A, the first example resource hierarchy traversal path begins at RN8, such as in response to a request by an accessor for a particular access (e.g., that would require a particular permission in order for the accessor to be granted the right to perform that particular access) to a particular resource associated with RN8. The permissions system 100 may access permission policy information associated with RN8 to determine whether the particular permission is granted at RN8. In the example scenario shown, the particular permission has not been granted at RN8, so the permissions system 100 moves up the tree hierarchy to RN4. The permissions system 100 may determine that a particular permission has not been granted at a resource node (e.g., RN8) by first checking whether there is any permission policy associated with the resource node. If no permission policy is associated with the resource node, then the permissions system 100 may conclude that the particular permission has not been granted. If one or more permission policies are associated with the resource node, the permissions system 100 may access each permission policy to determine whether the permission policy includes or grants the particular permission. If none of the one or more permissions policies associated with the resource node includes or grants the particular permission, then the permissions system 100 may conclude that the particular permission has not been granted.

Continuing the example scenario, the permissions system 100 may next determine that the particular permission has not been granted at RN4, and proceed up the tree hierarchy to RN2 where the particular permission is found. For example, RN 4 may be associated with one or more permissions policies, at least one of which includes or grants the particular permission, in which case the permissions system 100 may conclude that the particular permission has been granted. Thus, the traversal path in this example scenario is RN8→RN4→RN2. Once the particular permission is found at RN2, the permissions system 100 may impute that RN8 inherits the permission granted at RN2, and provide an indication that the particular permission being sought is allowed with respect to RN8.

FIG. 3B illustrates a second example resource hierarchy traversal path. In FIG. 3B, the example resource hierarchy traversal path again begins at RN8. As further described below, the permissions system 100 may traverse the example resource hierarchy traversal path shown in FIG. 3B in parallel with, serially before, or serially after traversing the first example resource hierarchy traversal path shown in FIG. 3A. The permissions system 100 may access permission policy information associated with RN8 to determine whether the particular permission is granted at RN8. In the example scenario shown, the particular permission has not been granted at RN8, so the permissions system 100 moves up the tree hierarchy to RN4. In the example scenario, the permissions system 100 may determine that the particular permission has not been granted at RN4. In this alternate traversal path, the permissions system 100 may proceed across the tree hierarchy to a different parent node of RN4, namely RN5. The permissions system 100 may determine that the particular permission has not been granted at RN5, and proceed up the tree hierarchy to RN3, and so on up to Resource Node 1, where the particular permission is found. Thus, the traversal path in this example scenario is RN8→RN4→RN5→RN3→Resource Node 1 (for example, the root node). Once the particular permission is found at Resource Node 1, the permissions system 100 may impute that RN8 inherits the permission granted at Resource Node 1, and provide an indication that the particular permission being sought is allowed with respect to RN8.

In various embodiments, the permissions system 100 may traverse a resource hierarchy in multiple different ways in parallel until a particular permission is found or not. For example, the permissions system 100 may search the resource hierarchy following both the traversal path illustrated in FIG. 3A and the traversal path illustrated in FIG. 3B, and hypothetically may stop the permission checking/path traversal as soon as the first node having the particular permission is found. Thus the process may stop once the permission is found at RN2 (the third node in the first sample traversal path) in FIG. 3A, before reaching RN3 or Resource Node 1 (the fourth and fifth nodes in the second sample traversal path) in FIG. 3B.

Alternatively, in some embodiments the permissions system 100 may traverse a resource hierarchy in multiple different ways serially until a particular permission is found or not. Thus an entire traversal path may be checked through to a root node (that is, a node without any parent nodes) before proceeding to another traversal path. For example, the permissions system 100 may search the resource hierarchy following the traversal path illustrated in FIG. 3B, and hypothetically may stop the permission checking/path traversal once the permission is found at Resource Node 1. Thus the process may stop once the permission is found at Resource Node 1 (the fifth and final node in the second sample traversal path) in FIG. 3B, before reaching RN2 (the third node in the first sample traversal path) in FIG. 3A.

In some instances, the permissions system 100 may traverse all possible resource hierarchy paths that are part of a parental or hierarchical relationship with a starting resource node, and determine that no resource node in any such hierarchy path has a particular permission sought with respect to the starting resource node. In this case the permissions system 100 may determine that the particular permission sought does not exist or apply with respect to the starting resource node, which may result in a permission denial for an accessor.

FIG. 4 illustrates sample resource and accessor hierarchy traversal paths demonstrating various ways in which a permission for a resource may be determined according to one embodiment of the permissions system 100 of FIG. 14. In this example the permissions system 100 may be configured to check one or both of a resource hierarchy and an accessor hierarchy to determine whether a particular accessor has a particular permission with respect to a particular resource. Similarly to as discussed with reference to FIGS. 3A, 3B, 7, and 8 herein, the permissions system 100 may check for permissions across one or more traversal paths in either the resource hierarchy or the accessor hierarchy serially or in parallel in any combination thereof. For example, the permissions system 100 may check both a resource hierarchy and an accessor hierarchy substantially in parallel and for the resource hierarchy check multiple traversal paths serially.

Continuing with the particular example shown in FIG. 4, the permissions system 100 is determining whether Accessor 3 has a permission P2 with respect to RN8. The permissions system 100 may begin the permissions check process, for example as described with reference to FIGS. 3A and 3B, by traversing the resource hierarchy until permission P2 is found or not found. The permissions system 100 may access permission policy information associated with RN8 and determine that the permission P2 is not found for Accessor 3. The permissions system 100 may then check RN4, RN2, and finally Resource Node 1 before finding that Accessor 3 has permission P2 with respect to Resource Node 1. The permissions system may then impute that, by virtue of RN8's inheritance of Resource Node 1's permissions, Accessor 3 also has permission P2 with respect to RN8.

Alternatively or in parallel to the permissions check on the resource hierarchy, the permissions system 100 may begin the permissions check process by traversing the accessor hierarchy until permission P2 is found or not found. The permissions system 100 may access permission policy information associated with Accessor 3 and determine that Accessor 3 does not have the permission P2 for any resource. The permissions system 100 may then traverse the accessor hierarchy to identify Accessor 2 as a parent of Accessor 3. Permissions for Accessor 2 may be accessed and analyzed to determine whether Accessor 2 has the permission P2 with respect to RN8. The permissions system 100 may determine that Accessor 2 does have permission P2 (for example, as shown in the permissions matrix data structure 500 discussed in more detail with reference to FIG. 5 herein), However, if the permissions system 100 determines that Accessor 2 does not have permission P2, then the permissions system 100 may then traverse the accessor hierarchy to identify Accessor 1 as a parent of Accessor 2. Permissions for Accessor 1 may be accessed and analyzed to determine whether Accessor 1 has the permission P2 with respect to RN8. The permissions system 100 may determine that Accessor 1 does have permission P2 (for example, as shown in the permissions matrix data structure 500 discussed in more detail with reference to FIG. 5 herein). Finally, the permissions system 100 may then impute that, by virtue of Accessor 3's inheritance of Accessor 2 or Accessor 1's permissions, Accessor 3 also has permission P2 with respect to RN8.

In another example, the permissions system 100 may perform resource and accessor hierarchy permissions checks in quasi-parallel processing mode as follows. First the permissions system 100 may traverse all paths of the resource hierarchy to search for permission P2 for Accessor 3, and determine that Accessor 3 does or does not have permission P2 for RN8 or any parent resource node of RN8. If Accessor 3 does not have permission P2, the permissions system 100 may next traverse the accessor hierarchy to determine any parent accessor nodes of Accessor 3, and identify Accessor 2 as a parent of Accessor 3. The permissions system 100 may then traverse all paths of the resource hierarchy to search for permission P2 for Accessor 2, and determine that Accessor 2 does or does not have permission P2 for RN8 or any parent resource node of RN8. If Accessor 2 does not have permission P2, the permissions system 100 may again traverse the accessor hierarchy to determine any parent accessor nodes of Accessor 2, and identify Accessor 1 as a parent of Accessor 1. The permissions system 100 may then traverse all paths of the resource hierarchy to search for permission P2 for Accessor 1, and determine whether Accessor 1 does or does not have permission P2 for RN8 or any parent resource node of RN8.

In yet another example, the permissions system 100 may first traverse the accessor hierarchy to identify any or all parent accessors of Accessor 3 (specifically, Accessor 2 and Accessor 1), and then traverse the resource hierarchy to determine whether any of Accessors 1, 2, or 3 has permission P2 with reference to RN8 or any parent resource node of RN8.

Of course, more complex resource and/or accessor hierarchies than the examples described herein may be possible, spanning hundreds, thousands, or even millions of resources and/or accessors associated in virtually unlimited ways, organized in as many levels of a hierarchy as a particular data system may require. However, the permissions systems and methods described herein may be applied to resource and/or accessor hierarchies of any size and complexity, providing efficiency, flexibility, and scalability of permissions and security policies for highly complex data systems and architectures.

Examples of Permissions System Data Architectures

FIG. 5 illustrates a resource and accessor permissions matrix data structure 500 as used in one embodiment of the permissions system 100 of FIG. 14. The permissions matrix data structure 500 provides one approach to representing permission policy information for accessors and resources in a data system. The permissions matrix data structure 500 is designed to be agnostic to any accessor and/or resource hierarchy information that may defined or known elsewhere in the data system. The permissions matrix data structure 500 defines what, if any, permissions (or permission policies) accessors have with respect to particular resources. For example, the permissions included in the matrix data structure 500 may be provided by system administrators, supervisors, executives, etc. that determine access rights of particular accessors.

In this example matrix data structure, columns correspond to resources in a data system and rows correspond to accessors having certain permissions in the data system. Each cell in the matrix corresponds to an intersection point between a resource and an accessor. The contents of each cell indicate zero or more permission policies associated with the accessor with respect to the resource. If a cell is empty, null, or otherwise void of contents, this would indicate that the accessor has no expressly defined permissions with respect to the resource. For example, in the permissions matrix data structure 500, Accessor 3 has no expressly defined permissions with respect to RN2 as indicated by the null indicator "-" contained in the corresponding intersection cell. However, the permissions matrix data structure 500 indicates that Accessor 1 has permission P1 with respect to RN2 as indicated by the indicator "P1" contained in the corresponding intersection cell.

Each of these data points considered alone informs whether these respective Accessors have express permission P1 with respect to RN2. However, the permissions system 100 may have access to an accessor hierarchy for the data system, such as the example accessor hierarchy of FIG. 2. Using the accessor hierarchy information together with the permissions matrix, the permissions system 100 can impute that Accessor 3 also has implied permission P1 with respect to RN2 by virtue of Accessor 3's grandchild relationship to Accessor 1.

One benefit of the clean permissions organization provided by the permissions matrix data structure 500 can be readily understood in terms of the hierarchy traversal processes described with reference to FIG. 4. In the example of FIG. 4, the permissions system 100 was determining whether Accessor 3 has a permission P2 with respect to RN8. Looking up the intersection of Accessor 3 and RN 8 in the permissions matrix data structure 500 indicates that Accessor 3 does not have an express P2 with respect to RN8.

The permissions system 100 can proceed next in various different ways. For example, by accessing a resource hierarchy (such as the resource hierarchy illustrated in FIG. 4) for the data system the permissions system 100 may determine that RN8 has a set of resource parents (and ancestors up to and including any root nodes), wherein the set includes: RN4, RN5, RN2, RN3, and Resource Node 1 (optionally listed or ranked, as here, in order of "closeness" to RN8). The permissions system 100 may now look up the intersection of Accessor 3 and any of RN4, RN5, RN2, RN3, and Resource Node 1 in the permissions matrix data structure 500. Such a look up would return an indication that Accessor 3 has permission P2 with respect to both Resource Node 1 and RN5. From this the permissions system 100 can impute that Accessor 3 has implied permission P2 with respect to RN8 by virtue of RN8's hierarchical relationship to RN5 or Resource Node 1.

Further, in one embodiment, the "closeness" ranking may enable the permissions system 100 to progressively check cell values corresponding to columns closest to RN8 in the permissions matrix data structure 500, for example in cases where columns may be sorted or organized by closeness in the resource hierarchy. Such an embodiment may enable the permissions system 100 to find permission P2 for Accessor 3 faster, such as by finding the permission with respect to RN5 before reaching Resource Node 1.

In another example, by accessing an accessor hierarchy (such as the accessor hierarchy illustrated in FIG. 4) for the data system, the permissions system 100 may determine that Accessor 3 has a set of accessor parents (and ancestors up to and including any root nodes), wherein the set includes: Accessor 2 and Accessor 1 (optionally listed or ranked, as here, in order of "closeness" to Accessor 3). The permissions system 100 may now look up the intersection of RN8 and any of Accessor 2 and Accessor 1 in the permissions matrix data structure 500. Such a look up would return an indication that Accessor 2 has permission P2 with respect to RN8. From this the permissions system 100 can impute that Accessor 3 also has implied permission P2 with respect to RN8 by virtue of Accessor 3's child relationship to Accessor 2.

The separation of permissions policy information from the rest of the accessor and/or resource hierarchy data in the data system provides numerous benefits and advantages. For example, accessors, resources, and the relationships there between in a data system may change frequently in complicated ways. Since the permissions matrix data structure does not include data regarding these relationships, the permissions data structure does not necessarily need to be updated, nor may not be impacted by, changes to either the accessor hierarchy or the resource hierarchy. Another benefit, which will be further illustrated with reference to the example database table illustrated and described with reference to FIG. 6, is efficient querying of the permissions data to enable highly responsive permissions policy checking for highly complex data systems.

In one embodiment, the default value for any permission or policy in any cell is 'none' or no permission. The absence of a policy in a cell indicates that the value is the default value which is always the lowest possible permission which is no permission, or permission denied. In one example, a policy indicator of "access:none" may be used to indicate the default policy value of for a policy named "access." In another example, a simple permission or policy is one where the possible values are simply 'yes' and 'no' where 'no' is the default value, indicating that an accessor either has the permission or policy or not.

FIG. 6 illustrates another resource and accessor permissions data structure as a database table, as used in one embodiment of the permissions system 100 of FIG. 14. The database table 600 defines for respective rows information relating an accessor, an accessor type, a resource, a resource type, a policy id, and a policy type. Thus each row in database table 600 may associate an accessor with a resource and a policy with respect to that resource. This design enables querying to quickly and efficiently retrieve information based on matching accessors, matching resources, and/or matching policies in any combination thereof. For example, a query to determine whether an accessor has a specific policy with respect to a particular resource may provide an Accessor ID, a Resource ID, and the Policy ID to determine whether any matches are found. If no matching rows are returned, the permissions system 100 may conclude or determine that the accessor does not have the particular policy for that resource. Of course, the data structure described here is but one example and many other variations may exist or be possible. For example, in another embodiment, only an accessor ID and not an accessor type may be implemented, or only a resource ID and not a resource type, and so on. In another embodiment, an integer could be used to uniquely identify an accessor or a resource. In another embodiment a string, or a URL, could be used to uniquely identify an accessor or a resource.

Figure 7A:
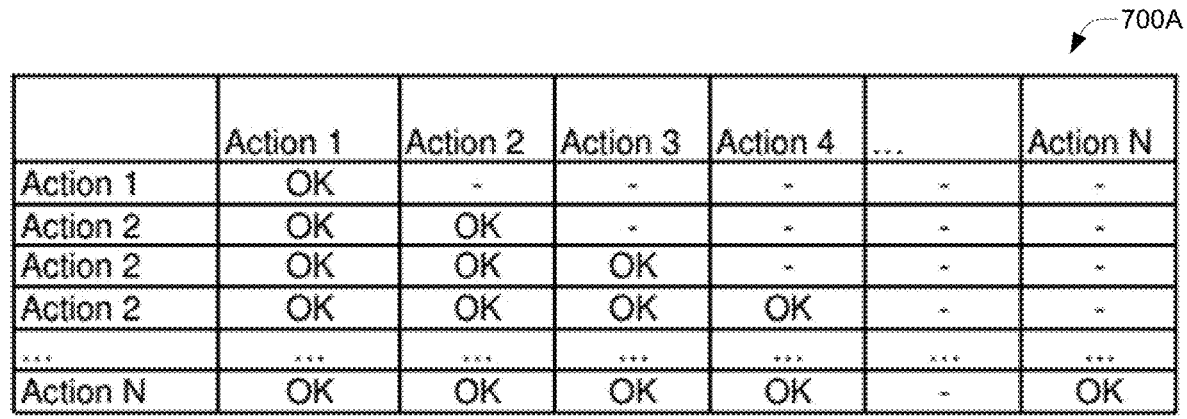
FIG. 7A illustrates an example cumulative policy data structure as used in one embodiment of the permissions system of FIG. 14.

FIG. 7A illustrates an example cumulative policy data structure 700A as used in one embodiment of the permissions system of FIG. 14. For example, a possible policy for a resource might include Actions 1 . . . N. Permission to perform some of these actions may imply permission perform other actions. For example, permission to perform Action 3 may imply permission to perform Actions 2 and 3, while permission to perform Action N may imply permission to perform Actions 1 . . . N. In the context of the example policy data structure 700A, the policy associated with an accessor may be represented by a row and permission is granted for proposed actions by moving to the corresponding column for that row.

Figure 7B:
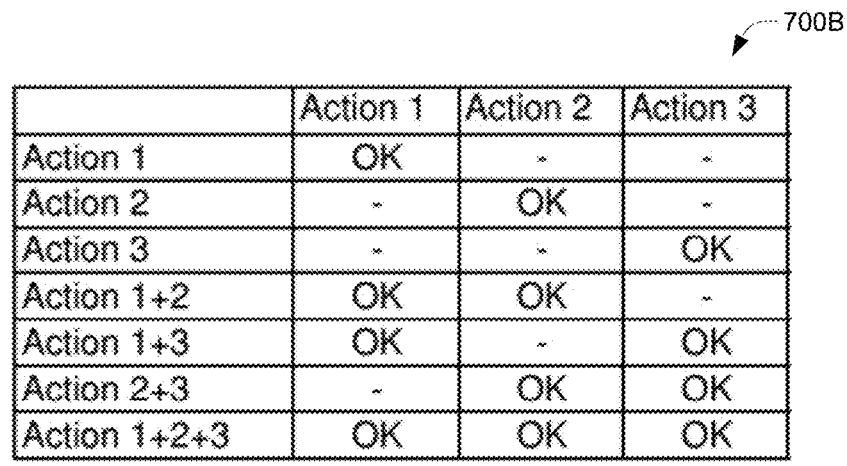
FIG. 7B illustrates an example disjoint policy data structure as used in one embodiment of the permissions system of FIG. 14.

FIG. 7B illustrates an example disjoint policy data structure 700B as used in one embodiment of the permissions system of FIG. 14. For example, in some embodiments possible values for a policy might not accumulate and may, instead, show possible combinations of more than one action. An example would be hypothetical permissions for resource (for example, a room): Action 1 (clean), Action 2 (sleep), and Action 3 (phone) where 'clean' grants permission to clean the room, 'sleep' shows permission to sleep in the room and 'phone' indicates permission to use the phone in the room. In this example an accessor may have any combination of these three actions, thereby creating seven possible values and a larger truth table than the example shown in FIG. 7A.

Examples of Processes Performed by Permissions Systems

FIGS. 8, 9, 10, 11, and 12 are flowcharts illustrating various embodiments of permissions system processes. In some implementations, the processes are performed by embodiments of the permissions system 100 described with reference to FIG. 14 and/or by one of its components, such as the such as permissions analysis module 122. For ease of explanation, the following describes the services as performed by the permissions system 100. The example scenarios are intended to illustrate, but not to limit, various aspects of the permissions system 100. In one embodiment, the processes can be dynamic, with some procedures omitted and others added.

Determining Permissions for an Accessor and a Resource

Figure 8:
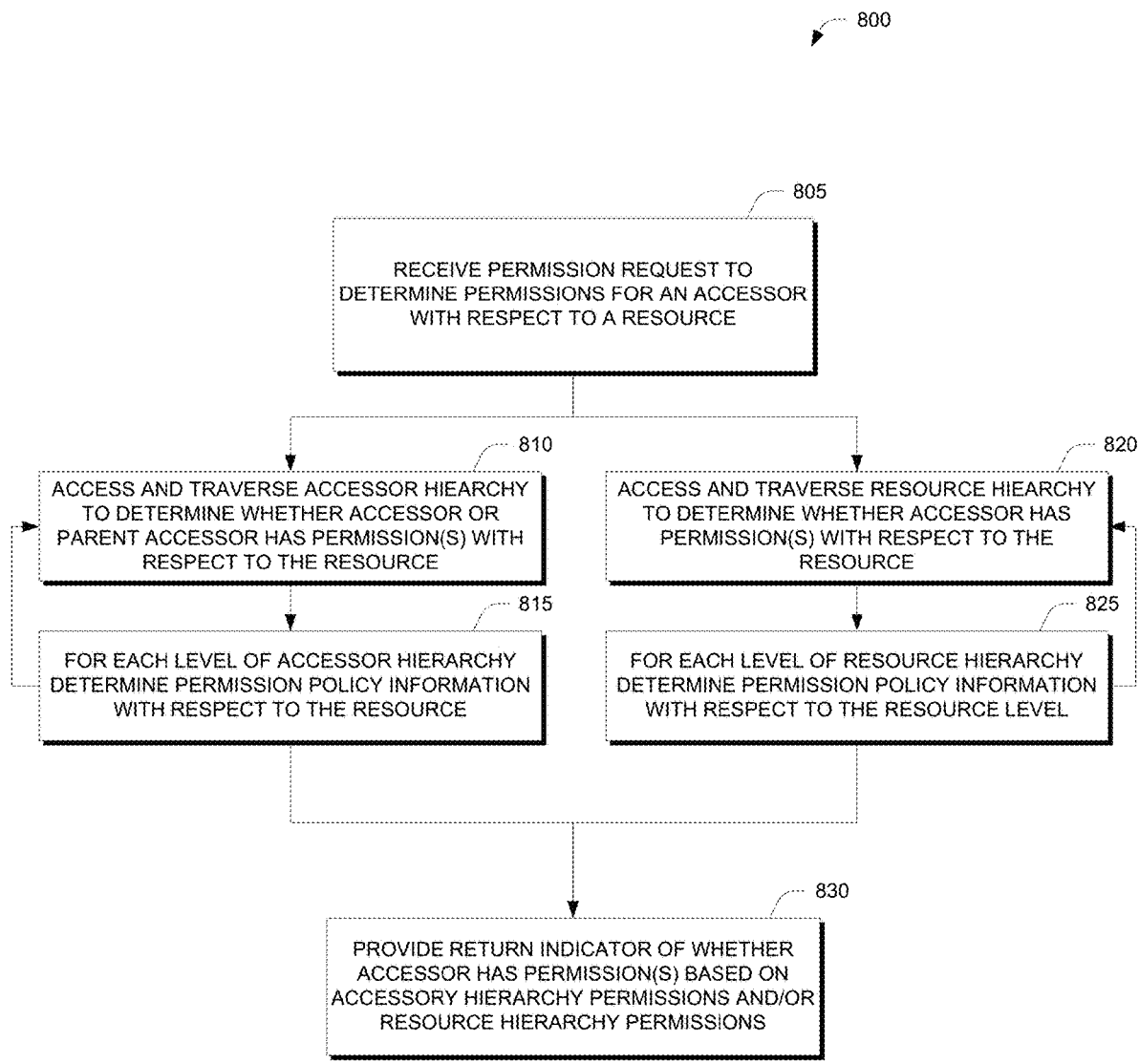
FIG. 8 is a flowchart for one embodiment of an example process for determining one or more permissions for an accessor with respect to a resource, as used in one embodiment of the permissions system of FIG. 14.

FIG. 8 is a flowchart illustrating one embodiment of a process 800 for determining one or more permissions for an accessor with respect to a resource, as used in one embodiment of the permissions system 100 of FIG. 14. The process 800 may be performed by the permissions system 100 separately or in conjunction with, for example, the process 900 of FIG. 9, the process 1000 of FIG. 10, the process 1100 of FIG. 11, and/or the process 1200 of FIG. 12. For ease of explanation certain portions of the description below describes the process with respect to an individual accessor and an individual resource. However the process may also be applied similarly to a plurality of accessors and/or a plurality of resources separately and/or in parallel, such as in batch processing of multiple thousands or millions of permissions determinations.

The process 800 begins at block 805, where the permissions system 100 (for example, via the permissions analysis module 122 of FIG. 14) receives a permission request to determine one or more permissions for an accessor with respect to a resource. As discussed in various embodiments herein, the permissions system 100 may process the request by analyzing an accessor hierarchy, which is discussed in more detail at blocks 810 and 815; and/or by analyzing a resource hierarchy, which is discussed in more detail at blocks 820 and 825. These two process subroutines may be executed by the permissions system 100 separately or in parallel in any combination.

At block 810, the permissions system 100 accesses and traverses an accessor hierarchy to determine whether the accessor, or a parent, ancestor, or accessor group associated with the accessor, has any permission(s) with respect to the resource. The accessor hierarchy may be accessed, for example, from the accessor data sources 174, which may store the accessor hierarchy information in one or more database tables or other data formats. The permissions system 100 may traverse the hierarchy for example as described with reference to FIGS. 2 and 4 herein.

Next, at block 815, the permissions system 100 determines permission policy information for each accessor or level of the accessor hierarchy with respect to the resource. The permission policy information may be accessed for example, from the permissions data sources 170.

The process 800 may repeat blocks 810 and 815 an indeterminate number of times until any and/or all permission policy information for the accessor, parent or ancestor of the accessor has been determined with respect to the resource. The process 800 may then proceed to block 830.

Alternatively or in parallel to the process at blocks 810 and 815, at block 820, the permissions system 100 accesses and traverses a resource hierarchy to determine whether the accessor has any permission(s) with respect to the resource, or a parent, ancestor, or resource group associated with the resource. The resource hierarchy may be accessed, for example, from the resource data sources 172. The permissions system 100 may traverse the hierarchy for example as described with reference to FIGS. 3A, 3B, and 4 herein.

At block 825, the permissions system 100 determines permission policy information for each resource or level of the resource hierarchy with respect to the accessor. The permission policy information may be accessed for example, from the permissions data sources 170, which may store the permission policy information in one or more database tables or other data formats, such as the data structures illustrated and described with reference to FIGS. 5 and 6 herein.

The process 800 may repeat blocks 820 and 825 an indeterminate number of times until any and/or all permission policy information for the resource, parent or ancestor of the resource has been determined with respect to the accessor. The process 800 may then proceed to block 830.

At block 830, the permissions system 100 provides a return indicator of whether the accessor has one or more permissions with respect to a resource. In some instances the return indicator may specify that neither the accessor nor any parent or ancestor accessors or accessor groups has any permissions with respect to the resource. In some instances the return indicator may include a listing of all permissions found for the accessor, with or without additional information for respective permissions indicating which level of the accessor hierarchy has the respective permission. In one embodiment the permissions information provided at block 830 may include or indicate one or more permission policies, wherein a respective permission policy may further define or specify actions the accessor may take with respect to the resource and other security access rights information.

Determining Accessors Having a Permission for a Resource

Figure 9:
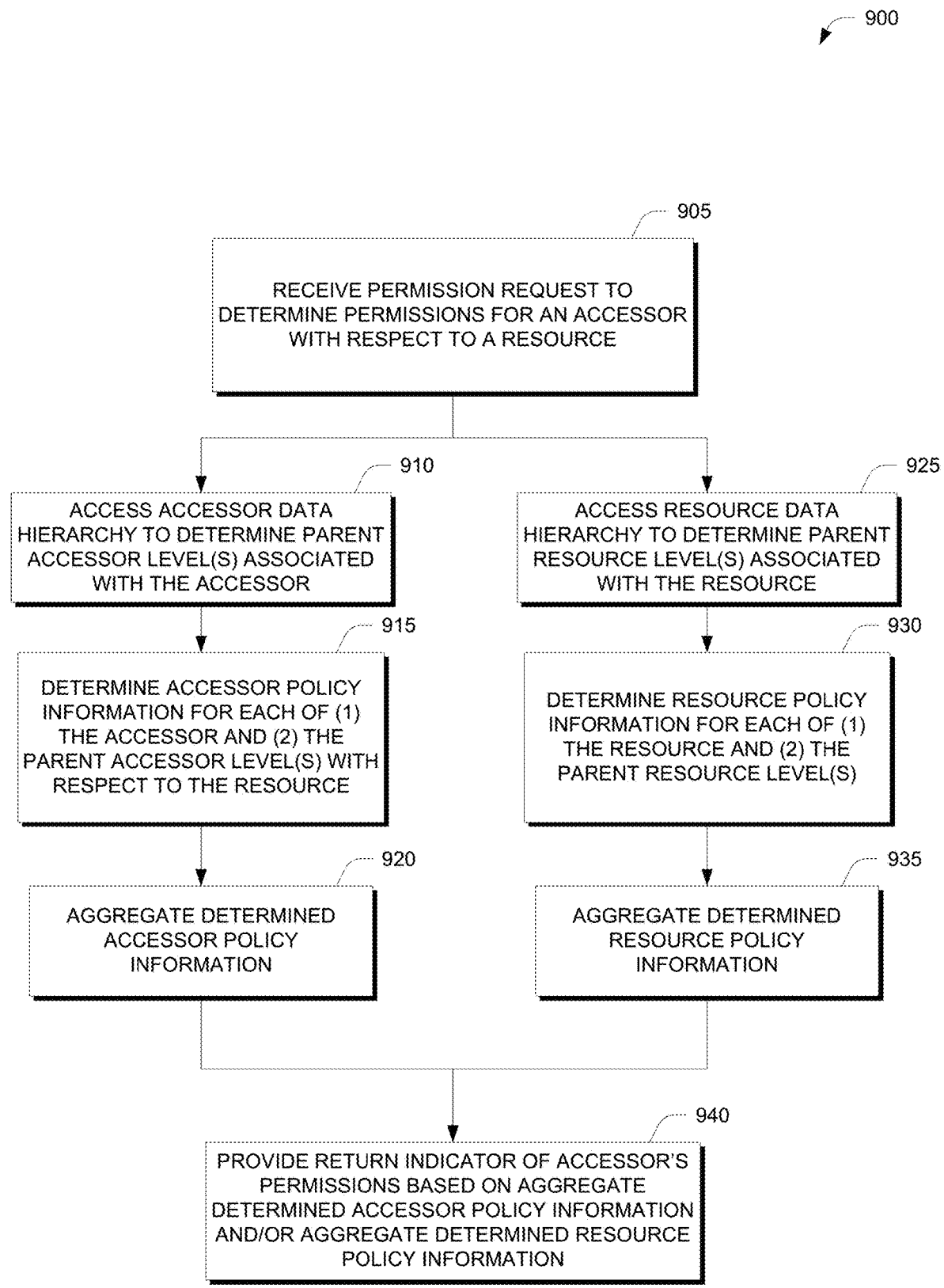
FIG. 9 is a flowchart for one embodiment of another example process for determining one or more permissions for an accessor with respect to a resource, as used in one embodiment of the permissions system of FIG. 14.

FIG. 9 is a flowchart illustrating one embodiment of another example process 900 for determining one or more permissions for an accessor with respect to a resource, as used in one embodiment of the permissions system 100 of FIG. 14. The process 900 may be performed by permissions system 100 separately or in conjunction with, for example, the processes 800 of FIG. 8, and/or the process 1000 of FIG. 10.

At block 905, the permissions system 100 (for example, via the permissions analysis module 122) receives a permission request to determine one or more permissions for an accessor with respect to a resource. As discussed in various embodiments herein, the permissions system 100 may process the request by analyzing an accessor hierarchy, which is discussed in more detail at blocks 915 through 925; and/or by analyzing a resource hierarchy, which is discussed in more detail at blocks 930 through 940. These two process subroutines may be executed by the permissions system 100 separately or in parallel in any combination.

At block 910, the permissions system 100 accesses accessor data hierarchy information to determine any parent, ancestor, and/or group accessor levels associated with the accessor of interest. The accessor data hierarchy may be accessed for example, from the accessor data sources 174.

At block 915, the permissions system 100 accesses permission policy information for each of (1) the accessor and (2) each respective parent, ancestor a, and/or group accessor levels with respect to the resource. The permission policy information may be accessed for example, from the permissions data sources 170. For example, a permission policy database table may be queried to retrieve all permissions associated with each respective accessor and filter the query or query results to identify permissions associated with the particular resource of interest.

The process 900 may repeat block 915 an indeterminate number of times until any and/or all permission policy information for the parent, ancestor, and/or group accessor has been determined with respect to the resource. The process 900 may then proceed to block 920.

At block 920, the permissions system 100 aggregates the determined accessor permission policy information accessed for each of (1) the accessor and (2) each respective parent/ancestor accessor levels with respect to the resource.

Alternatively or in parallel to the process at blocks 910 through 920, at block 910, the permissions system 100 accesses resource data hierarchy information to determine any parent, ancestor, and/or group resource levels associated with the resource of interest. The resource data hierarchy may be accessed for example, from the resource data sources 172.

At block 915, the permissions system 100 accesses permission policy information for each of (1) the resource and (2) each respective parent, ancestor, and/or group resource levels with respect to the accessor. The permission policy information may be accessed for example, from the permissions data sources 170. For example, a permission policy database table may be queried to retrieve all permissions associated with each respective resource and filter the query or query results to identify permissions associated with the particular accessor of interest.

The process 900 may repeat block 930 an indeterminate number of times until any and/or all permission policy information for the parent, ancestor, and/or group resource has been determined with respect to the accessor. The process 900 may then proceed to block 935.

At block 935, the permissions system 100 aggregates the determined resource permission policy information accessed for each of (1) the resource and (2) each respective parent/ancestor resource levels with respect to the accessor.

Finally, at block 940 the permissions system 100 provides a return indicator of whether the accessor's permissions based on the aggregate determined accessor policy information (for example, from block 920) and/or the aggregate determined resource policy information (for example, from block 935).

Determining Accessors Having a Permission for a Resource

Figure 10:
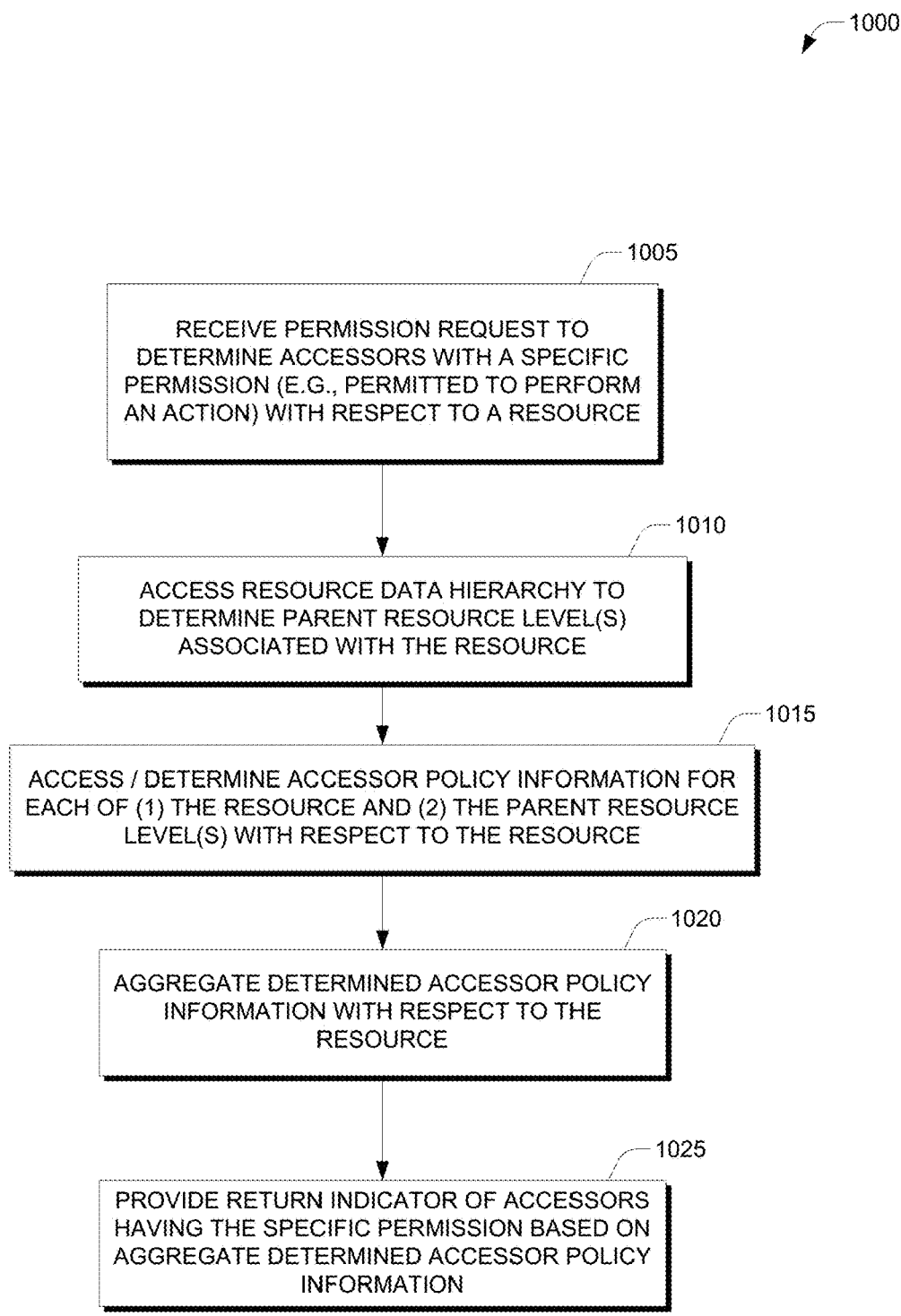
FIG. 10 is a flowchart for one embodiment of an example process for determining one or more accessors which have a permission with respect to a resource, as used in one embodiment of the permissions system of FIG. 14.

FIG. 10 is a flowchart illustrating one embodiment of a process 1000 for determining one or more accessors which have a specific permission with respect to a resource, as used in one embodiment of the permissions system 100 of FIG. 14.

The process 1000 begins at block 1005, where the permissions system 100 receives a permission request to determine one or more accessors with a specific permission (for example, permitted to perform a specific action) with respect to a resource.

At block 1010, the permissions system 100 accesses resource data hierarchy information to determine any parent, ancestor, and/or group resource levels associated with the resource of interest. The resource data hierarchy may be accessed for example, from the resource data sources 172.

Next, at block 1015, the permissions system 100 accesses and determines accessor permission policy information for each of (1) the resource and (2) each respective parent, ancestor, and/or group resource levels. The permission policy information may be accessed for example, from the permissions data sources 170. For example, a permission policy database table may be queried to retrieve all accessors associated with each respective resource having the specific permission of interest.

At block 1020, the permissions system 100 aggregates the determined accessor permission policy information accessed for each of (1) the resource and (2) each respective parent/ancestor resource levels. The permissions system 100 can use the aggregated permission policy information to generate a list of all accessors having the specific permission of interest with respect to the resource of interest, either expressly or by implied inheritance from a parent/ancestor resource level or group.

At block 1025, the permissions system 100 provides a return indicator, such as the list generated at block 1020, of accessors having the specific permission based on the aggregate determined accessor permission policy information. The returned information can be used, for example, by the requesting data system to determine whether to allow one or more accessors to perform a specific action, enable or disable display of certain user interfaces or user interface elements, and so on.

Determining Accessor Permission for a Resource Using an Accessor Hierarchy

Figure 11:
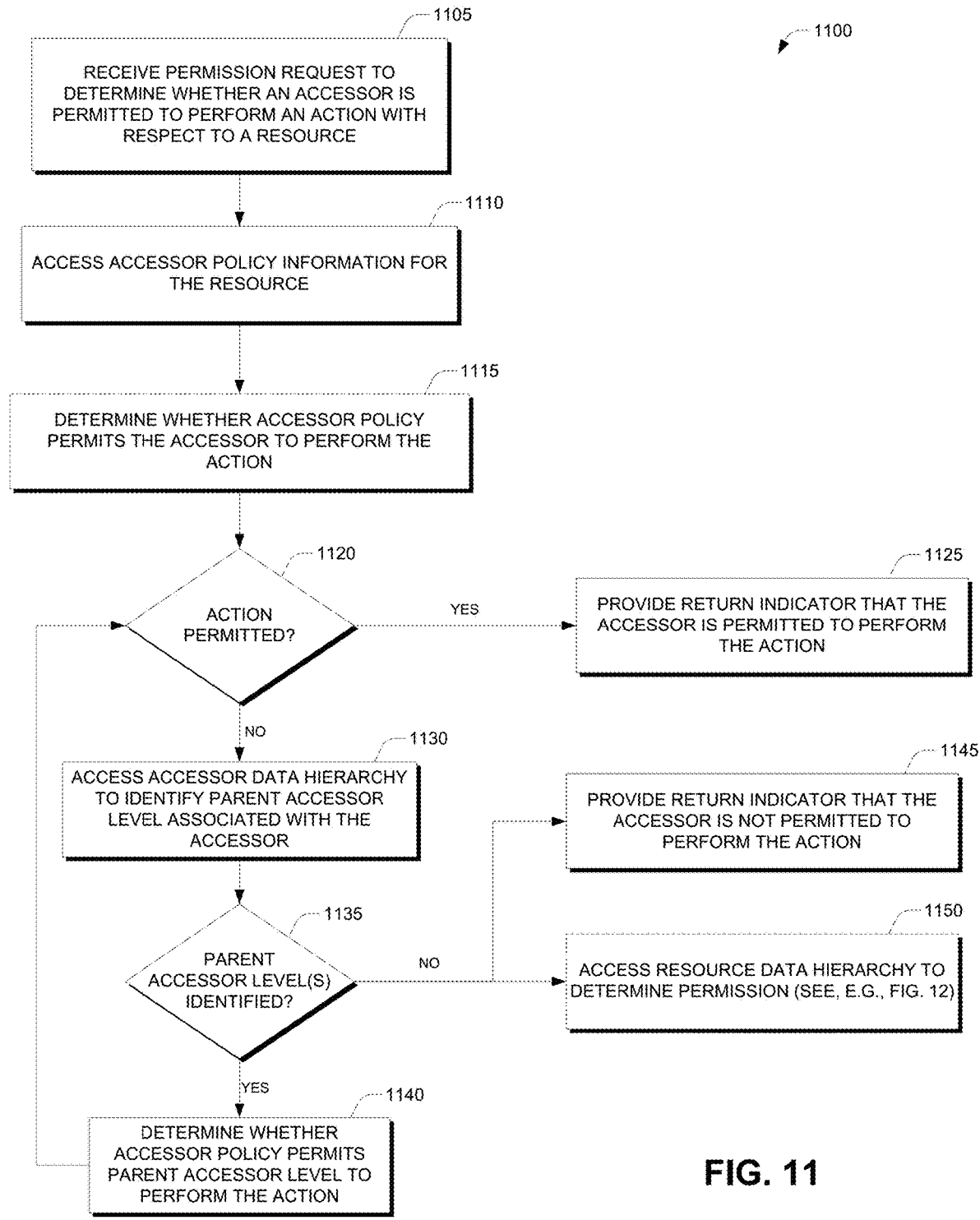
FIG. 11 is a flowchart for one embodiment of an example process for determining whether an accessor has a particular permission with respect to a resource using an accessor data hierarchy, as used in one embodiment of the permissions system of FIG. 14.

FIG. 11 is a flowchart illustrating one embodiment of a process 1100 for determining whether an accessor has a particular permission with respect to a resource using an accessor data hierarchy, as used in one embodiment of the permissions system 100 of FIG. 14. The process 1100 may be performed by permissions system 100 separately or in conjunction with, for example, the process 1200 of FIG. 12.

The process 1100 begins at block 1105, where the permissions system 100 receives a permission request to determine whether a particular accessor is permitted to perform a specific action with respect to a resource.

At block 1110, the permissions system 100 initially accesses accessor permission policy information for the resource. The permission policy information may be accessed for example, from the permissions data sources 170. For example, a permission policy database table may be queried to retrieve any permission policies associated with the particular accessor with respect to resource of interest.

Next, at block 1115, the permissions system 100 may perform an initial determination as to whether the accessor permission policy permits the particular accessor to perform the specific action.

At block 1120, the permissions system 100 determines whether the action is permitted. In response to determining that the action is permitted the process 1100 may proceed to block 1125. In response to determining that the action is not permitted the process 400 may proceed to block 1130.

At block 1125 if the accessor has permission to perform the specific action with respect to the resource the permissions system 100 may provide a return indicator to indicate the same, and the process 1100 can end.

If the process 1100 continues from block 1120, then at block 1130, the permissions system 100 may next access accessor data hierarchy information to determine any parent, ancestor, and/or group accessor levels associated with the accessor of interest. The accessor data hierarchy may be accessed for example, from the accessor data sources 174.

At block 1135, the permissions system 100 determines whether any parent accessor level(s) were identified. In response to determining that at least one parent accessor level was identified, the process 1100 may proceed to block 1140. In response to determining that no parent accessor level(s) were identified the process 1100 may proceed to either block 1145 or block 1150. For example, in one embodiment, the process 1100 may proceed to block 1145 to provide a return indicator to indicate that the accessor is not permitted to perform the specific action and end the process.

In another embodiment, the process 1100 may proceed to block 1150 to optionally access a resource data hierarchy to determine whether the specific permission is allowed on any parent resource levels associated with the resource of interest.

At block 1140 determines whether any accessor permission policy for any identified parent accessor level(s) permits the identified parent accessor level(s) to perform the specific action. The permission policy information may be accessed for example, from the permissions data sources 170. For example, a permission policy database table may be queried to retrieve any permission policies associated with the particular accessor parent with respect to resource of interest.

The process 1100 may return to block 1120 and repeat the permission check process from blocks 1120 through 1135 an indeterminate number of times until a determination is reached as to whether the accessor or any parent accessor levels associated with the accessor does or does not have the permission to perform the specific action. Depending on the determined outcome the process 1100 may then proceed to any of blocks 1125, 1145, or 1150.

At block 1145 in response to determining that (1) the accessor does not have permission to perform the specific action with respect to the resource, and/or that (2) the accessor does not have any parent accessor levels or (3) any parent accessor levels do not have permission to perform the specific action, the permissions system 100 may provide a return indicator to indicate that the accessor is not permitted to perform the specific action, and the process 1100 can end.

At block 1150, in response to determining that (1) the accessor does not have permission to perform the specific action with respect to the resource, and/or that (2) the accessor does not have any parent accessor levels or (3) any parent accessor levels do not have permission to perform the specific action, the permissions system 100 may optionally access a resource data hierarchy to determine whether the specific permission is allowed on any parent resource levels associated with the resource of interest. One example of this process is described and illustrated with reference to FIG. 12 herein.

Determining Accessor Permission for a Resource Using a Resource Hierarchy

Figure 12:
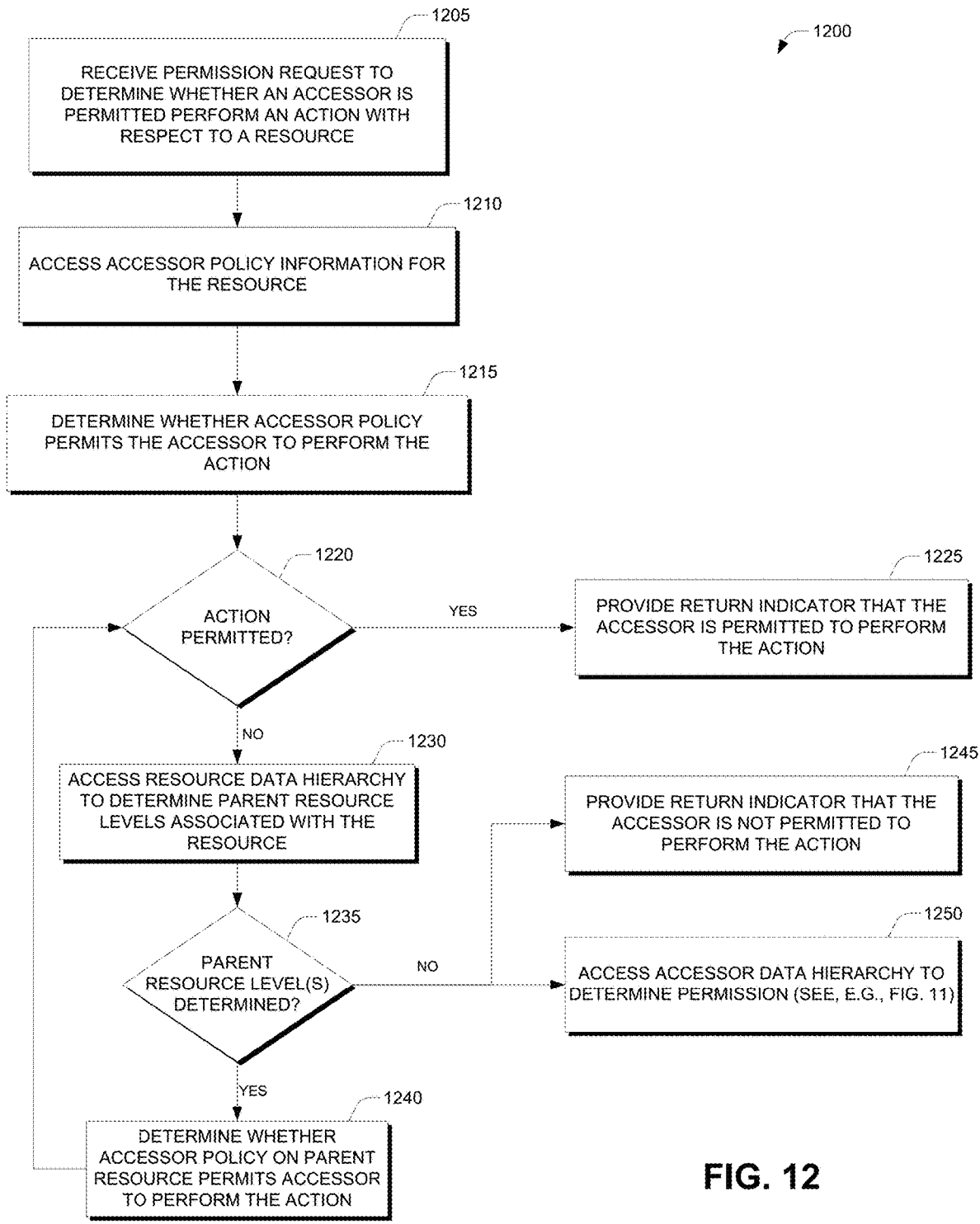
FIG. 12 is a flowchart for one embodiment of an example process for determining w whether an accessor has a particular permission with respect to a resource using a resource data hierarchy, as used in one embodiment of the permissions system of FIG. 14.

FIG. 12 is a flowchart illustrating one embodiment of a process 1200 for determining whether an accessor has a particular permission with respect to a resource using a resource data hierarchy, as used in one embodiment of the permissions system 100 of FIG. 14. The process 1200 may be performed by permissions system 100 separately or in conjunction with, for example, the process 1100 of FIG. 10.

The process 1200 begins at block 1205, where the permissions system 100 receives a permission request to determine whether a particular accessor is permitted to perform a specific action with respect to a resource.

At block 1210, the permissions system 100 initially accesses accessor permission policy information for the resource. The permission policy information may be accessed for example, from the permissions data sources 170. For example, a permission policy database table may be queried to retrieve any permission policies associated with the particular accessor with respect to resource of interest.

Next, at block 1215, the permissions system 100 may perform an initial determination as to whether the accessor permission policy permits the particular accessor to perform the specific action.

At block 1220, the permissions system 100 determines whether the action is permitted. In response to determining that the action is permitted the process 1200 may proceed to block 1225. In response to determining that the action is not permitted the process 1200 may proceed to block 1230.

At block 1225 if the accessor has permission to perform the specific action with respect to the resource the permissions system 100 may provide a return indicator to indicate the same, and the process 1200 can end.

If the process 1200 continues from block 1220, then at block 1230, the permissions system 100 may next access resource data hierarchy information to determine any parent, ancestor, and/or group resource levels associated with the resource of interest. The resource data hierarchy may be accessed for example, from the resource data sources 172.

At block 1235, the permissions system 100 determines whether any parent resource level(s) were identified. In response to determining that at least one parent resource level was identified, the process 1200 may proceed to block 1240. In response to determining that no parent resource level(s) were identified the process 400 may proceed to either block 1245 or block 1250.

At block 1240 determines whether any accessor permission policy for any identified parent resource level(s) permits the accessor to perform the specific action. The permission policy information may be accessed for example, from the permissions data sources 170. For example, a permission policy database table may be queried to retrieve any permission policies associated with the particular resource parent with respect to accessor of interest.

The process 1200 may return to block 1220 and repeat the permission check process from blocks 1220 through 1235 an indeterminate number of times until a determination is reached as to whether the accessor does or does not have the permission to perform the specific action with respect to the resource of interest or any identified parent resource levels (s). Depending on the determined outcome the process 1200 may then proceed to any of blocks 1225, 1245, or 1250.

At block 1245, in response to determining that (1) the accessor does not have permission to perform the specific action with respect to the resource, and/or that (2) the resource does not have any parent accessor levels or (3) the accessor does not have permission to perform the specific action with respect to any parent accessor levels, the permissions system 100 may provide a return indicator to indicate that the accessor is not permitted to perform the specific action, and the process 1200 can end.

At block 1250, in response to determining that (1) the accessor does not have permission to perform the specific action with respect to the resource, and/or that (2) the resource does not have any parent accessor levels or (3) the accessor does not have permission to perform the specific action with respect to any parent accessor levels, the permissions system 100 may optionally access an accessor data hierarchy to determine whether the specific permission is allowed for any parent accessor level associated with the resource of interest. One example of this process is described and illustrated with reference to FIG. 11 herein.

Example User Interfaces

Figure 13A:
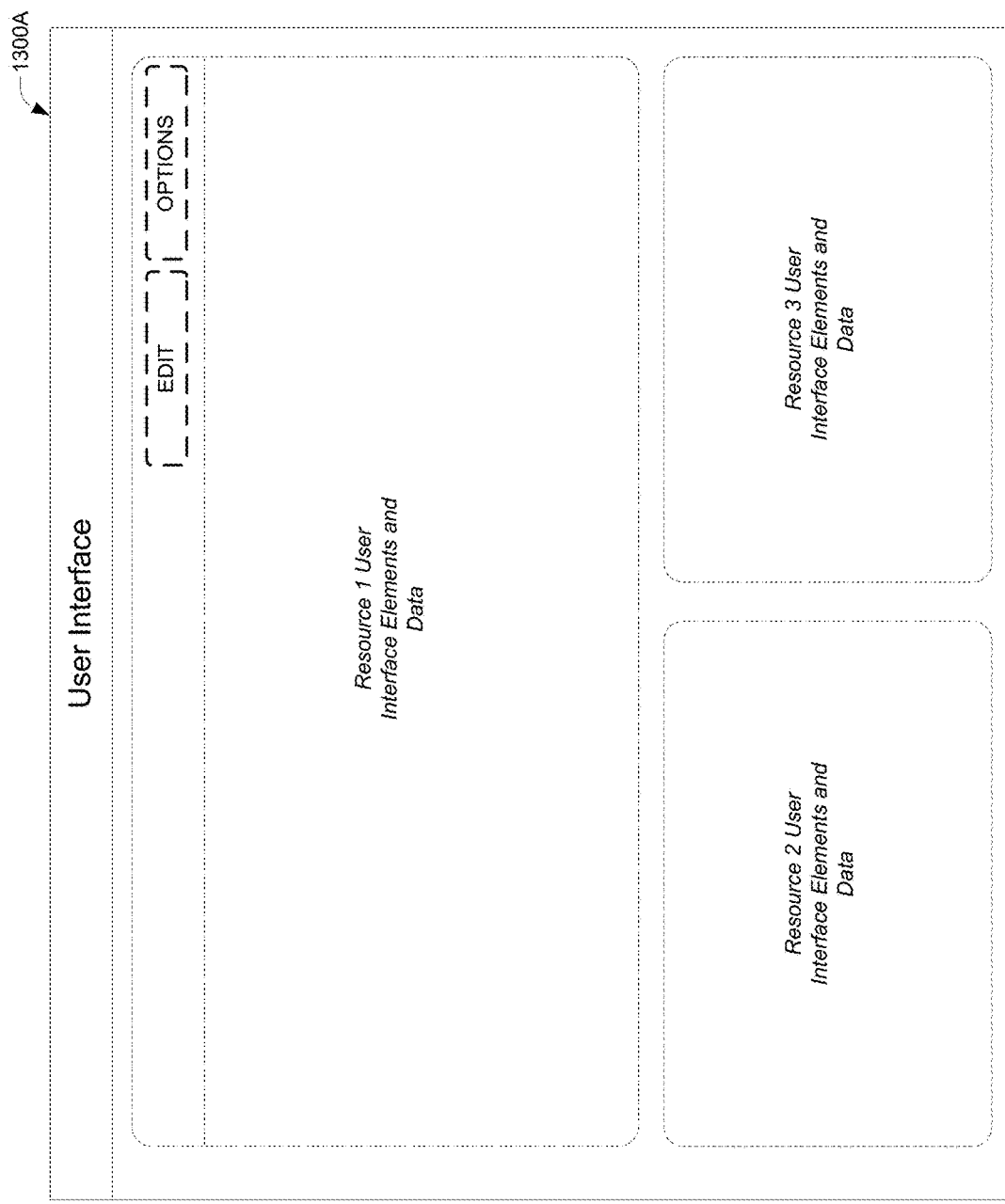
FIG. 13A illustrates an example user interface for possibly presenting various UI elements associated with various resources, as generated using one embodiment of the permissions system of FIG. 14.

FIG. 13A illustrates an example user interface ("UI") 1300A for possibly presenting various UI elements associated with various resources, as generated using one embodiment of the permissions system of FIG. 14. The UI 1300A may include various display elements including for example user interaction controls such as the "EDIT" or "OPTIONS" buttons, and various display areas including a display areas for UI elements and data related to or associated with a Resource 1, a Resource 2, and/or a Resource 3. These display elements are illustrated with dashed lines to indicate, for example, that they may or may not be displayed to the user depending on whether the user has permission to view certain elements or perform certain actions. Whether certain of these display elements, user interaction controls areas, UI elements, and data are displayed to the user may be determined, for example, based on user permissions that may be determined by the permissions system 100. For example, one user having both an edit permission and a permission to configure options may be presented with both the "EDIT" and the "OPTIONS" buttons, while another user having only the permission to configure options (and/or only a view permission, but not the edit permission (may be presented with only the "OPTIONS" button (e.g., as illustrated in FIG. 13B).

Figure 13B:
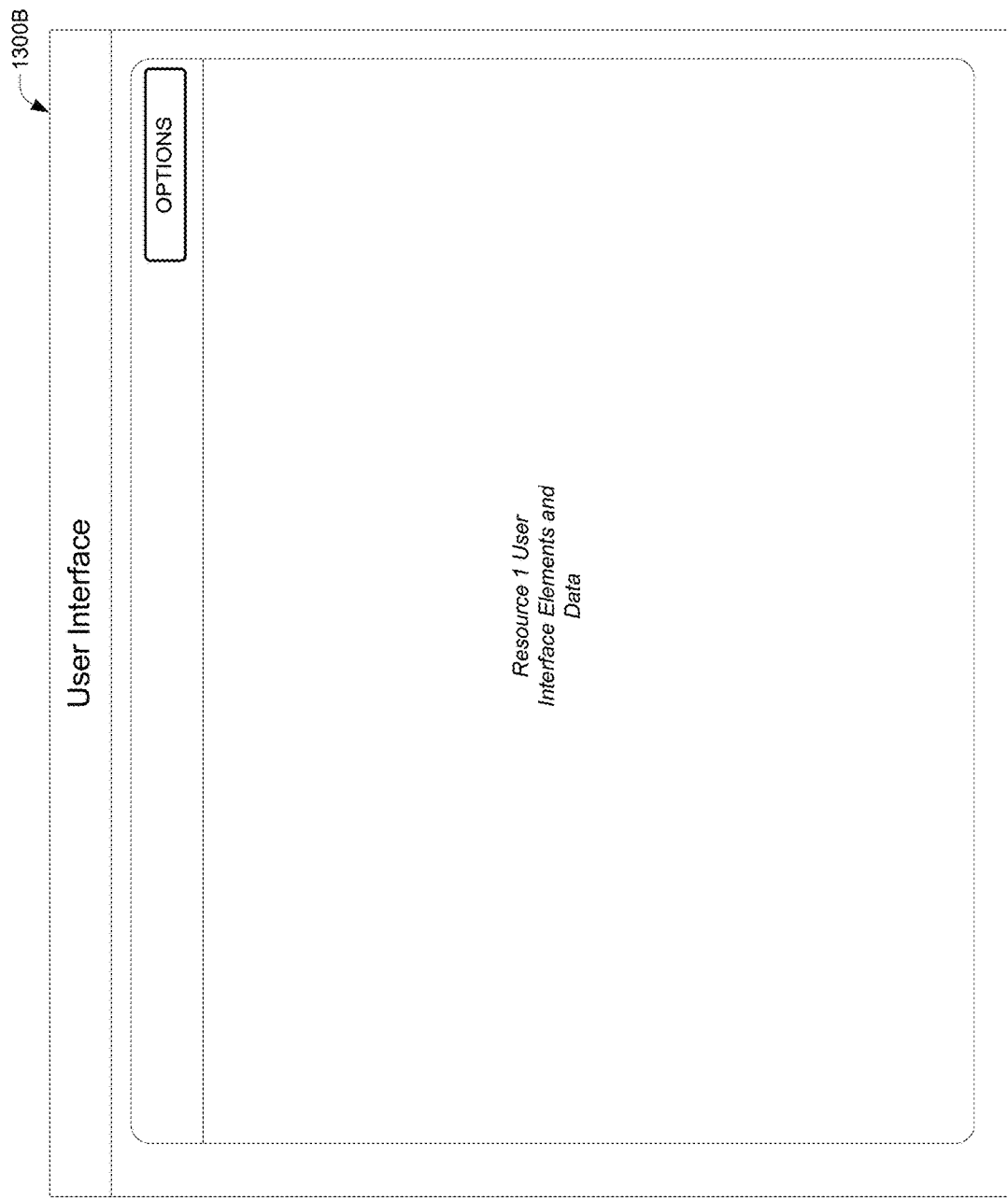
FIG. 13B illustrates a variation of the example user interface of FIG. 13A wherein one or more various UI elements associated with various resources are not displayed in accordance with determined permissions, as generated using one embodiment of the permissions system of FIG. 14.

FIG. 13B illustrates an example user interface 1300B that is a variation of the example user interface of FIG. 13A wherein one or more various UI elements associated with various resources are not displayed in accordance with determined permissions, as generated using one embodiment of the permissions system of FIG. 14. In the variant UI 1300B, only the user interaction control for the "OPTIONS" button and the display area for UI elements and data related to or associated with a Resource 1 are displayed. For example, the permissions system 100 may have determined that the accessor or user accessing the user interface does not have a necessary "EDIT" permission, and thus that user interaction control may be disabled or not displayed at all. Similarly, the permissions system 100 may have determined that the accessor or user accessing the user interface does not have view policy permission with respect to Resource 2 and Resource 3, and thus the corresponding display areas may not be displayed to the user.

Example System Implementation and Architecture

FIG. 14 is a block diagram of one embodiment of a permissions system 100 in communication with a network 160 and various systems, such as client computing systems (s) 168, permissions data source(s) 170, resource data source (s) 172, and/or accessor data source(s) 174. The permissions system 100 may be used to implement systems and methods described herein, including but not limited to the processes 800, 900, 1000, 1100, and 1200 of FIGS. 8, 9, 10, 11, and 12 respectively.

Permissions System

In the embodiment of FIG. 14, the permissions system 100 includes an authentication module 122 and a user interface module 124 that may be stored in the mass storage device 120 as executable software codes that are executed by the CPU 150. These and other modules in the permissions system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 14, the permissions system 100 is configured to execute the modules recited above to perform the various methods and/or processes for permissions analysis and determination as described herein (such as the processes described with respect to FIGS. 8, 9, 10, 11, and 12 herein).

The permissions analysis module 122 provides capabilities related to permissions determination processes described, for example, with reference to FIGS. 8, 9, 10, 11, and 12 herein. For example, the permissions analysis module 122 may be configured to among other things determine whether a particular accessor has a particular permission with respect to a resource; determine which users have a particular permission with respect to a resource; and/or determine which permissions are allowed for a particular accessor with respect to a resource. In executing any of these permission determinations the permissions analysis module 122 may be further configured to access permission policy information from the permissions data source(s) 170, to access resource hierarchy information from the resource data source(s) 172, and/or to access accessor hierarchy information from the accessor data source(s) 174. The permissions analysis module 122 may be configured to traverse one or both of an accessor hierarchy and a resource hierarchy in order to determine whether and what types of permissions are allowed for respective accessors and respective resources.

The user interface module 124 provides capabilities related to generation and presentation of one or more user interfaces, such as the sample user interfaces illustrated with reference to FIGS. 13A and 13B herein. The user interface module 124 may interact with the permissions analysis module 122 in order to determine permissions for users or accessors of a data system and determine which user interfaces and/or user interface elements to display, enable, and/or disable according to permission policies.

The permissions system 100 includes, for example, a server, workstation, or other computing device. In one embodiment, the exemplary permissions system 100 includes one or more central processing units ("CPU") 150, which may each include a conventional or proprietary microprocessor. The permissions system 100 further includes one or more memories 130, such as random access memory ("RAM") for temporary storage of information, one or more read only memories ("ROM") for permanent storage of information, and one or more mass storage device 120, such as a hard drive, diskette, solid state drive, or optical media storage device. Typically, the modules of the permissions system 100 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA"), and Extended ISA ("EISA") architectures, for example. In addition, the functionality provided for in the components and modules of permissions system 100 may be combined into fewer components and modules or further separated into additional components and modules.

The permissions system 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the permissions system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary permissions system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia analytics, for example. The permissions system 100 may also include one or more multimedia devices 140, such as speakers, video cards, graphics accelerators, and microphones, for example.

Network

In the embodiment of FIG. 14, the I/O devices and interfaces 110 provide a communication interface to various external devices. In the embodiment of FIG. 14, the permissions system 100 is electronically coupled to a network 160, which comprises one or more of a LAN, WAN, and/or the Internet, for example, via a wired, wireless, or combination of wired and wireless, communication link. The network 160 communicates with various computing devices and/or other electronic devices via wired or wireless communication links.

According to FIG. 14, in some embodiments information may be provided to or accessed by the permissions system 100 over the network 160 from one or more permissions data source(s) 170, resource data source(s) 172, and/or accessor data source(s) 174. The permissions data source(s) 170, resource data source(s) 172, and/or accessor data source(s) 174 may include one or more internal and/or external data sources. In some embodiments, one or more of the databases or data sources may be implemented using a relational database, such as Sybase, Oracle, CodeBase, MySQL, and Microsoft® SQL Server as well as other types of databases such as, for example, a flat file database, an entity-relationship database, and object-oriented database, and/or a record-based database.

Permissions Data Sources

The permissions data source(s) 170 may store, for example, permission policy information related to or describing one or more permission policies for a data system; and linking or associating one or more permission policies to accessors and resources in the data system. In one embodiment permission policy information may be stored in one or more database tables or other data formats, such as the data structures illustrated and described with reference to FIGS. 5 and 6 herein.

Resource Data Sources

The resource data source(s) 172 may store, for example, resource hierarchy and accessor hierarchy information in one or more database tables or other data formats. A resource hierarchy may include or specify any resources associated with a particular resource. The association or relationship may be parent-child (for example, the particular resource may have one or more child resources); child-parent (for example, the particular resource may have one or more parent resources); sibling (for example, the particular resource may have one or more sibling or same-level resources); or any ancestor style definition (for example, the particular resource may have one or more ancestor resources, which may be parents of parents and so on).

Accessor Data Sources

The accessor data source(s) 174 may store, for example, accessor hierarchy information in one or more database tables or other data formats. An accessor hierarchy may include or specify any accessors associated with a particular accessor. The association or relationship may be parent-child (for example, the particular accessor may have one or more child accessors); child-parent (for example, the particular accessor may have one or more parent accessors); sibling (for example, the particular accessor may have one or more sibling or same-level accessors); or any ancestor style definition (for example, the particular accessor may have one or more ancestor accessor, which may be parents of parents and so on).

OTHER EMBODIMENTS

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the permissions system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the permissions system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computing system comprising:
a non-transitory computer-readable medium storing software instructions; and
one or more hardware processors in communication with the non-transitory computer-readable medium and configured to execute the software instructions to cause the computing system to at least:
receive a permission check request associated with an accessor and a requested resource;
identify at least one related accessor related to the accessor in an accessor hierarchy, wherein the related accessor is a parent-level or higher accessor logically connected directly or indirectly to the accessor in the accessor hierarchy;
determine first permission policy data associated with the related accessor and the requested resource;
identify at least one related resource related to the requested resource in a resource hierarchy, wherein the related resource is a parent-level or higher resource logically connected directly or indirectly to the requested resource in the resource hierarchy;
determine second permission policy data associated with the accessor and the related resource; and
generate a permission policy associated with the accessor and the requested resource based at least in part on the first permission policy data associated with the related accessor and the requested resource, and the second permission policy data associated with the accessor and the related resource.

2. The computing system of claim 1, wherein the permission policy is reflective of one or more permissions the accessor has with respect to the requested resource and/or the related resource and one or more permissions the related accessor has with respect to the requested resource and/or the related resource.

3. The computing system of claim 1, wherein the permission policy is reflective of one or more permissions of the requested resource with respect to the accessor and/or the related accessor.

4. The computing system of claim 3, wherein the permission policy includes two or more permissions with respect to the accessor and/or the requested resource.

5. The computing system of claim 4, wherein the two or more permissions are cumulative such that one permission is inclusive of at least one other permission.

6. The computing system of claim 3, wherein the permission policy includes three or more permissions with respect to the accessor and/or the requested resource, wherein at least one permission is disjoint such that the at least one permission is exclusive of at least two other permissions.

7. The computing system of claim 1, wherein the permission check request indicates an action to be performed by the accessor with respect to the requested resource.

8. The computing system of claim 7, wherein the one or more hardware processors are further configured to execute the software instructions to cause the computing system to at least:
include the action to be performed by the accessor with respect to the requested resource in the permission policy.

9. A computer-implemented method comprising:
by one or more hardware computing devices configured with specific computer executable instructions:
receiving a request indicating an accessor and a requested resource;
identifying at least one related accessor related to the accessor in an accessor hierarchy;
determining first permission policy data associated with the related accessor and the requested resource;
identifying at least one related resource related to the requested resource in a resource hierarchy;
determining second permission policy data associated with the accessor and the related resource; and
providing a response to the request including a permission policy associated with the accessor and the requested resource based at least in part on the permission policy data associated with the related accessor and the requested resource, and the second permission policy data associated with the accessor and the related resource.

10. The computer-implemented method of claim 9, wherein the permission policy is reflective of one or more permissions the accessor has with respect to the requested resource and/or the related resource and one or more permissions the related accessor has with respect to the requested resource and/or the related resource.

11. The computer-implemented method of claim 9, wherein the related accessor is a parent-level or higher accessor logically connected directly or indirectly to the accessor in the accessor hierarchy, and wherein the related resource is a parent-level or higher resource logically connected directly or indirectly to the requested resource in the resource hierarchy.

12. The computer-implemented method of claim 9, wherein the permission policy is reflective of one or more permissions the accessor has with respect to the resource and/or the related resource.

13. The computer-implemented method of claim 12, wherein the permission policy includes two or more permissions with respect to the accessor and/or the requested resource.

14. The computer-implemented method of claim 13, wherein the two or more permissions are cumulative such that one permission is inclusive of at least one other permission.

15. The computer-implemented method of claim 12, wherein the permission policy includes three or more permissions with respect to the accessor and/or the requested resource, wherein at least one permission is disjoint such that the at least one permission is exclusive of at least two other permissions.

16. The computer-implemented method of claim 9 further comprising:
under control of the one or more hardware computing device configured with specific computer executable instructions:
identifying, based on the permission policy, a set of authorized accessors permitted to perform an action related to the requested resource.

17. The computer-implemented method of claim 16, wherein the action is received with the request and is included in the permission policy.

\* \* \* \* \*